(12) United States Patent
Chung et al.

(10) Patent No.: US 12,159,263 B2
(45) Date of Patent: Dec. 3, 2024

(54) METHOD AND DEVICE FOR MANAGING PROJECT

(71) Applicant: SAMSUNG E&A CO., LTD., Seoul (KR)

(72) Inventors: Won Sang Chung, Seoul (KR); Hoon Yi Keun, Seoul (KR); Baek Hun Song, Seoul (KR); Hyun Il Lee, Seoul (KR); Hyeon Gi Baek, Seoul (KR); Hyo Jin Kim, Seoul (KR); Eun Hye Kwon, Seoul (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/286,884

(22) PCT Filed: Aug. 24, 2022

(86) PCT No.: PCT/IB2022/057916
§ 371 (c)(1),
(2) Date: Oct. 13, 2023

(87) PCT Pub. No.: WO2022/269584
PCT Pub. Date: Dec. 29, 2022

(65) Prior Publication Data
US 2024/0193547 A1 Jun. 13, 2024

(51) Int. Cl.
*G06Q 10/06* (2023.01)
*G06Q 10/0631* (2023.01)
(Continued)

(52) U.S. Cl.
CPC ... *G06Q 10/103* (2013.01); *G06Q 10/063114* (2013.01); *G06Q 10/067* (2013.01); *G06Q 50/08* (2013.01)

(58) Field of Classification Search
CPC ......... G06Q 10/103; G06Q 10/063114; G06Q 10/067; G06Q 50/08
(Continued)

(56) References Cited

U.S. PATENT DOCUMENTS 7,409,392 B2 * 8/2008 Greer .................... G06Q 10/06
707/999.102
2005/0171790 A1 8/2005 Blackmon
(Continued)

FOREIGN PATENT DOCUMENTS

CN 107256318 A 10/2017
KR 102222384 B1 3/2021
(Continued)

OTHER PUBLICATIONS

International Search Report and Written Opinion of the International Searching Authority, in corresponding International Application No. PCT/IB2022,057916, dated Nov. 30, 2022, 9 pgs.
(Continued)

*Primary Examiner* — Jonathan P Ouellette
(74) *Attorney, Agent, or Firm* — Panitch Schwarze Belisario & Nadel LLP

(57) ABSTRACT

According to a preferred embodiment of the present disclosure, a project management device includes: a division unit configured to divide a project into n construction work packages (CWPs) based on a construction type constituting the project, a minimum unit area for managing the project, and design information; and a display unit configured to classify the n CWPs according to construction statuses and work front statuses and display the n CWPs in a grid form.

9 Claims, 22 Drawing Sheets

(51) Int. Cl.
  *G06Q 10/067* (2023.01)
  *G06Q 10/10* (2023.01)
  *G06Q 10/101* (2023.01)
  *G06Q 50/08* (2012.01)

(58) Field of Classification Search
  USPC .................................................. 705/1.1–912
  See application file for complete search history.

(56) References Cited

U.S. PATENT DOCUMENTS

| | | |
|---|---|---|
| 2014/0229212 A1* | 8/2014 | MacElheron .. G06Q 10/063114 |
| | | 705/7.17 |
| 2016/0149974 A1 | 5/2016 | Abrams et al. |
| 2019/0057354 A1* | 2/2019 | McKenzie ............. G06Q 50/08 |
| 2019/0138667 A1* | 5/2019 | Benesh ................. G06Q 50/08 |
| 2022/0277268 A1 | 9/2022 | Kojima et al. |
| 2022/0300889 A1 | 9/2022 | Oosato et al. |

FOREIGN PATENT DOCUMENTS

| | | |
|---|---|---|
| KR | 20210023381 A | 3/2021 |
| KR | 102411939 B1 | 6/2022 |
| WO | 2021064876 A1 | 4/2021 |
| WO | 2021064877 A1 | 4/2021 |

OTHER PUBLICATIONS

Advanced Work Packaging: Design through Workface Execution, Construction Industry Institute, Construction Owners Association of Alberta, Oct. 2013, vol. 1, 84 pgs.

* cited by examiner

FIG. 4

| CONSTRUCTION TYPE | INDIVIDUAL CONSTITUENT UNITS | CONSTRUCTION PLAN | | SYSTEM (S-AWP) | | | |
|---|---|---|---|---|---|---|---|
| | | | | DESIGN (DRAWING) PLAN | PROCUREMENT (MATERIAL) PLAN | | |
| | | CONSTRUCTION QUANTITY (PERIOD) | DETERMINE START DATE / DETERMINE FINISH DATE | | MATERIAL ARRIVAL REQUEST DATE (e.g. 30 DAYS BEFORE START OF CONSTRUCTION) | MATERIAL ARRIVAL START DATE | MATERIAL ARRIVAL END DATE |
| PIPING | CWP =Line BUNDLE | CONSTRUCTION QUANTITY (PERIOD) | DETERMINE START DATE / DETERMINE FINISH DATE | DRAWING ISSUE REQUEST DATE (e.g. 60 DAYS BEFORE START OF CONSTRUCTION) | MATERIAL ARRIVAL REQUEST DATE (e.g. 30 DAYS BEFORE START OF CONSTRUCTION) | MATERIAL ARRIVAL START DATE | MATERIAL ARRIVAL END DATE |
| STEEL FRAME | CWP =Assembly BUNDLE | CONSTRUCTION QUANTITY (PERIOD) | DETERMINE START DATE / DETERMINE FINISH DATE | DRAWING ISSUE REQUEST DATE (e.g. 60 DAYS BEFORE START OF CONSTRUCTION) | MATERIAL ARRIVAL REQUEST DATE (e.g. 30 DAYS BEFORE START OF CONSTRUCTION) | MATERIAL ARRIVAL START DATE | MATERIAL ARRIVAL END DATE |
| MACHINE, EQUIPMENT | CWP =Item BUNDLE | CONSTRUCTION QUANTITY (PERIOD) | DETERMINE START DATE / DETERMINE FINISH DATE | N/A | MATERIAL ARRIVAL REQUEST DATE (e.g. 30 DAYS BEFORE START OF CONSTRUCTION) | MATERIAL ARRIVAL START DATE | MATERIAL ARRIVAL END DATE |
| CIVIL ENGINEERING | CWP =Foundation BUNDLE | CONSTRUCTION QUANTITY (PERIOD) | DETERMINE START DATE / DETERMINE FINISH DATE | DRAWING ISSUE REQUEST DATE (e.g. 60 DAYS BEFORE START OF CONSTRUCTION) | N/A | MATERIAL ARRIVAL START DATE | N/A |

FIG. 5

| CONSTRUCTION TYPE | PERFORMANCE UNITS (= INDIVIDUAL CONSTITUENT UNITS) | SYSTEM (ERP) | | | | | | |
|---|---|---|---|---|---|---|---|---|
| | | CONSTRUCTION PERFORMANCE (FMCS) | | | DESIGN PERFORMANCE (EWP) | | PROCUREMENT PERFORMANCE (PWP, FMCS) | |
| PIPING | INDIVIDUAL LINE | INDIVIDUAL LINE PERFORMANCE QUANTITY (ACTUAL Q'ty) | CONSTRUCTION START DATE | CONSTRUCTION FINISH DATE | DRAWINGS FOR EACH LINE (ISO Drawing, Weld Map) | QUANTITY FOR EACH LINE (Net Q'ty) | EXPECTED DRAWING ISSUE DATE (EXPECTED DATE) ISSUE DATE | MATERIAL ARRIVAL FAILURE | EXPECTED MATERIAL ARRIVAL DATE (ETA) | MATERIAL ARRIVAL DATE (RECEIVED DATE) |
| STEEL FRAME | INDIVIDUAL ASSEMBLY | ASSEMBLY INSTALLATION PERFORMANCE QUANTITY (ACTUAL Q'ty) | CONSTRUCTION START DATE | CONSTRUCTION FINISH DATE | ASSEMBLY DRAWINGS | ASSEMBLY QUANTITY (Net Q'ty) | EXPECTED DRAWING ISSUE DATE (EXPECTED DATE) ISSUE DATE | MATERIAL ARRIVAL FAILURE | EXPECTED MATERIAL ARRIVAL DATE (ETA) | MATERIAL ARRIVAL DATE (RECEIVED DATE) |
| MACHINERY | INDIVIDUAL ITEM | ITEM INSTALLATION PERFORMANCE QUANTITY (ACTUAL Q'ty) | CONSTRUCTION START DATE | CONSTRUCTION FINISH DATE | N/A | N/A | N/A | MATERIAL ARRIVAL FAILURE | EXPECTED MATERIAL ARRIVAL DATE (ETA) | MATERIAL ARRIVAL DATE (RECEIVED DATE) |
| CIVIL ENGINEERING | INDIVIDUAL FOUNDATION | FOUNDATION CONSTRUCTION PERFORMANCE QUANTITY (ACTUAL Q'ty) | CONSTRUCTION START DATE | CONSTRUCTION FINISH DATE | FOUNDATION DRAWINGS | FOUNDATION QUANTITY (Net Q'ty) | EXPECTED DRAWING ISSUE DATE (EXPECTED DATE) ISSUE DATE | N/A | N/A | N/A |

FIG. 6

DATA TYPE FOR OUTPUTTING WORK FRONT STATUS

| | | | CWP WORK FRONT QUANTITY (Work Front Q'ty) | | |
|---|---|---|---|---|---|
| | CWP CONSTRUCTION PLAN | CRITERIA | CONSTRUCTION INFORMATION | PROCUREMENT INFORMATION | DESIGN INFORMATION |
| NECESSARY DATA 610 | CONSTRUCTION PLAN START DATE<br>CONSTRUCTION PLAN FINISH DATE<br>CONSTRUCTION PLAN TOTAL QUANTITY (Total Q'ty)<br>DAILY TARGET CONSTRUCTION QUANTITY<br>CUMULATIVE DAILY TARGET CONSTRUCTION QUANTITY (Target Q'ty) | PRESENT | CONSTRUCTION PERFORMANCE QUANTITY (Actual Q'ty) 611 | MATERIAL ARRIVAL QUANTITY<br>MATERIAL ARRIVAL DATE | DRAWING ISSUE QUANTITY<br>DRAWING ISSUE DATE |
| | | FUTURE | CONSTRUCTION PERFORMANCE QUANTITY (Actual Q'ty) 612 | MATERIAL ARRIVAL QUANTITY<br>MATERIAL ARRIVAL DATE<br>ESTIMATED MATERIAL ARRIVAL QUANTITY<br>ESTIMATED MATERIAL ARRIVAL DATE (ETA¹) 613 | DRAWING ISSUE QUANTITY<br>DRAWING ISSUE DATE<br>ESTIMATED DRAWING ISSUE QUANTITY<br>ESTIMATED DRAWING ISSUE DATE |
| RESULT DATA 620 | WORK FRONT STATUS<br>WORK FRONT STATUS (SHOW THIS MONTH AND AFTER THIS MONTH AS CUT-OFF REFERENCE) 621 | PRESENT AND FUTURE | CONSTRUCTION PERFORMANCE QUANTITY (Work Front Q'ty)<br>WORK FRONT QUANTITY DATE (Work Front Date) | INSUFFICIENT MATERIAL LIST | INSUFFICIENT DRAWING LIST |

FIG. 7

| CRITERIA | | NECESSARY INFORMATION | PIPING | STEEL FRAME | MACHINERY | CIVIL ENGINEERING |
|---|---|---|---|---|---|---|
| PRESENT | DESIGN INFORMATION | DRAWING ISSUE QUANTITY (Net Q'ty) | ○ | ○ | × | ○ |
| | | DRAWING ISSUE DATE (Issue Date) | ○ | ○ | × | ○ |
| | MATERIAL INFORMATION | MATERIAL ARRIVAL QUANTITY (Received Q'ty) | ○ | ○ | ○ | × |
| | | MATERIAL ARRIVAL DATE (Received Date) | ○ | ○ | ○ | × |
| FUTURE | DESIGN INFORMATION | DRAWING ISSUE QUANTITY (Net Q'ty) | ○ | ○ | × | ○ |
| | | DRAWING ISSUE DATE (Issue Date) | ○ | ○ | × | ○ |
| | | ESTIMATED DRAWING ISSUE QUANTITY (Net Q'ty) | ○ | ○ | × | ○ |
| | | ESTIMATED DRAWING ISSUE DATE (Expected Date) | ○ | ○ | × | ○ |
| | MATERIAL INFORMATION | MATERIAL ARRIVAL QUANTITY (Received Q'ty) | ○ | ○ | ○ | × |
| | | MATERIAL ARRIVAL DATE (Received Date) | ○ | ○ | ○ | × |
| | | ESTIMATED MATERIAL ARRIVAL QUANTITY (ETA Q'ty) | ○ | ○ | ○ | × |
| | | ESTIMATED MATERIAL ARRIVAL DATE (ETA) | ○ | ○ | ○ | × |
| WORK FRONT TYPES | | | Work Front Type.1 (CONSIDER DRAWINGS AND MATERIALS) ~ 710 | | Work Front Type.2 (CONSIDER ONLY MATERIALS) ~ 720 | Work Front Type.3 (CONSIDER ONLY DRAWINGS) ~ 730 |

FIG. 8

| CONSTRUCTION TYPE | Work Front: WORK FRONT OF INDIVIDUAL CONSTITUENT UNIT ― 810 | | | CWP-BASED WORK FRONT RESULTS ― 820 |
|---|---|---|---|---|
| | INDIVIDUAL CONSTITUENT UNIT | Work Front Type | WORK FRONT RESULTS | |
| PIPING | Line / Spool² | Type 1 | Work Front Date<br>Work Front Q'ty<br>Work Front Status | SUM OF INDIVIDUAL CONSTITUENT UNIT RESULTS<br>Work Front Date<br>Work Front Q'ty<br>Work Front Status |
| STEEL FRAME | Assembly | Type 1 | | |
| MACHINERY | Item | Type 2 | | |
| CIVIL ENGINEERING | Foundation | Type 3 | | |

METHOD AND DEVICE FOR MANAGING PROJECT

TECHNICAL FIELD

The present disclosure relates to a device and method for managing a construction project by establishing a project schedule and managing a performance status through exchange of information among design, procurement, and construction.

DESCRIPTION OF RELATED ART

Construction project management systems do not consider drawings and material statuses or consider only material statuses or drawings. Thus, an integrated project management system configured to collect and combine together all drawings and material statues in real time is necessary for smooth construction.

In addition, because construction projects are carried out in dozens of areas at the same time, it is difficult to recognize the construction statuses and constructability of sub-projects in arbitrary areas, and information on the construction statuses and constructability of sub-projects in arbitrary areas is manually collected. In addition, it is difficult to intuitively recognize which sub-projects are highly risky.

PRIOR ART DOCUMENTS

Patent Documents (Patent Document 1) KR 10-2222384 B1

CONTENT OF DISCLOSURE

Problems to be Addressed

Preferred embodiments of the present disclosure provide a device and method for managing a project by intuitively recognizing the construction status and constructability of the project and classifying and recognizing risk levels.

Solution to Problem

According to a preferred embodiment of the present disclosure, a project management device includes: a division unit configured to divide a project into n construction work packages (CWPs) based on a construction type constituting the project, a minimum unit area for managing the project, and design information; and a display unit configured to classify the n CWPs according to construction statuses and work front statuses and display the n CWPs in a grid form, wherein when the construction type is piping, the work front statuses are calculated separately based on present and future, wherein when the work front statuses are calculated based on the future, work front statuses of individual constituent units are calculated by matching a procurement arrival and a scheduled material to a line set according to priority through three independent sequential simulations, and then the work front statues of the individual constituent units are added up on a CWP basis to obtain CWP-based work front statuses, wherein the three independent sequential simulations are performed in an order of: a weld map that is a detailed drawing for performing an actual construction based on the line, which is an individual constituent unit of piping; an ISO drawing that is a drawing before preparing a detailed construction drawing; and 3D that is a drawing before preparing a line drawing.

In a preferred embodiment of the present disclosure, a horizontal axis of the grid form of the display unit indicates stage-based construction statuses, and a vertical axis of the grid form of the display unit indicates stage-based work front statuses, wherein each of grid boxes of the grid form indicates information on a construction status and a work front status, and information on the number of CWPs having the construction status and the work front status.

In a preferred embodiment of the present disclosure, the display unit shows risk information by using positions of the grid boxes of the grid form.

In a preferred embodiment of the present disclosure, when the information on the number of CWPs in each of the grid boxes is clicked, only CWPs corresponding to the grid box are selected from the n CWPs by filtering, and detailed information on the selected CWPs are shown.

In a preferred embodiment of the present disclosure, the construction type includes piping, a steel frame, machinery, and civil engineering, wherein work front statuses of individual constituent units are first calculated on a construction type basis while considering at least one of a drawing and a material according to the construction type of the project, and then the work front statuses of the individual constituent units are added up on a CWP basis to obtain the work front statuses based on the CWPs.

According to a preferred embodiment of the present disclosure, a project management method includes: dividing, a division unit, a project into n construction work packages (CWPs) based on a construction type constituting the project, a minimum unit area for managing the project, and design information; and classifying, by a display unit, the n CWPs according to construction statuses and work front statuses and displaying the n CWPs in a grid form on the display unit, wherein when the construction type is piping, the work front statuses are calculated separately based on present and future, wherein when the work front statuses are calculated based on the future, work front statuses of individual constituent units are calculated by matching a procurement arrival and a scheduled material to a line set according to priority through three independent sequential simulations, and then the work front statues of the individual constituent units are added up on a CWP basis to obtain CWP-based work front statuses, wherein the three independent sequential simulations are performed in an order of: a weld map that is a detailed drawing for performing an actual construction based on the line, which is an individual constituent unit of piping; an ISO drawing that is a drawing before preparing a detailed construction drawing; and 3D that is a drawing before preparing a line drawing.

According to a preferred embodiment of the present disclosure, a project management method includes: dividing, a division unit, a project into n construction work packages (CWPs) based on a construction type constituting the project, a minimum unit area for managing the project, and design information; and classifying, by a display unit, the n CWPs according to construction statuses and work front statuses and displaying the n CWPs in a grid form on the display unit, wherein a horizontal axis of the grid form indicates stage-based construction statuses, and a vertical axis of the grid form indicates stage-based work front statuses, wherein each of grid boxes of the grid form indicates information on a construction status and a work front status, and information on the number of CWPs having the construction status and the work front status.

Advantageous Effects of Disclosure

In a preferred embodiment of the present disclosure, the project management device may collect construction schedules and performance data and may automatically calculate a daily work front quantity (constructible quantity). In addition, risk levels may be classified and managed based on a construction status and a work front status (constructible quantity status).

In a preferred embodiment of the present disclosure, the project management device may automatically collect and share information on design drawings, procurement materials, and constructions in a construction project, and thus it is substantially possible to establish a construction plan through proactive construction management.

In a preferred embodiment of the present disclosure, the project management device may prepare a schedule by defining construction work packages (CWPs) each corresponding to a bundle of individual constituent units defined in design as construction targets, and thus data on designs, procurement, constructions may be automatically collected through a given system based on the construction targets.

In a preferred embodiment of the present disclosure, the project management device may simultaneously reflect drawings and material data received from an operating system used by persons in charge, and thus work fronts of individual constituent units may be independently used according to three types: drawings, materials, and drawings & materials.

In addition, the project management device may automatically output six statuses (Before Start, Start in This Month, In Progress, Late Start, Late Finish, and Complete) of CWPs based on this month and a future time point (three months later) by using performance data (Start Date, Finish Date, and Actual Quantity) of individual construction targets which are automatically collected according to a planned schedule.

BRIEF DESCRIPTION OF DRAWINGS

FIG. 4 is a view illustrating planning criteria for construction work packages (CWPs) according to a preferred embodiment of the present disclosure.

FIG. 5 is a view illustrating an example in which an enterprise resource planning (ERP) database automatically collects construction performance, design performance, and procurement performance based on individual constituent units according to a preferred embodiment of the present disclosure.

FIG. 6 is a view illustrating necessary data and result data, which are required to output a work front status according to a preferred embodiment of the present disclosure.

FIG. 7 is an example view illustrating necessary data required for calculating a work front status, and work front types according to constructions, according to a preferred embodiment of the present disclosure.

FIG. 8 is a view illustrating an example of calculating a CWP work front quantity based on construction types according to a preferred embodiment of the present disclosure.

DETAILED DESCRIPTION

Hereinafter, the present disclosure will be described with reference to the drawings so that those of ordinary skill in the art to which the present disclosure pertains may easily understand and implement the present disclosure.

Figure 1:
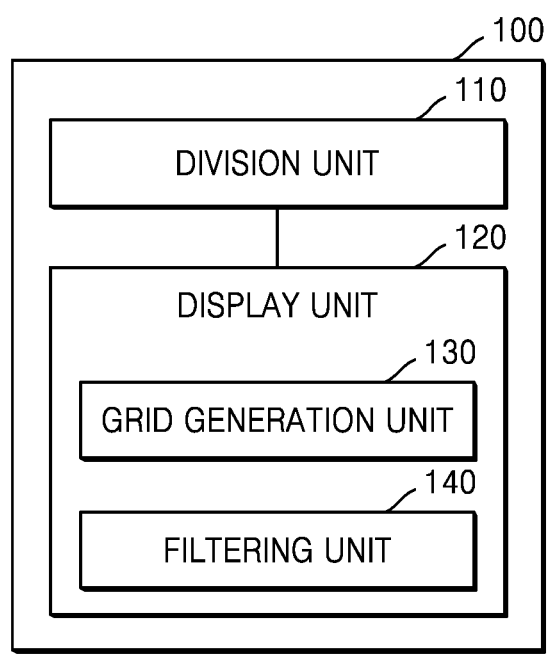
FIG. 1 is a view illustrating an internal configuration of a project management device according to a preferred embodiment of the present disclosure.
Figure 2:
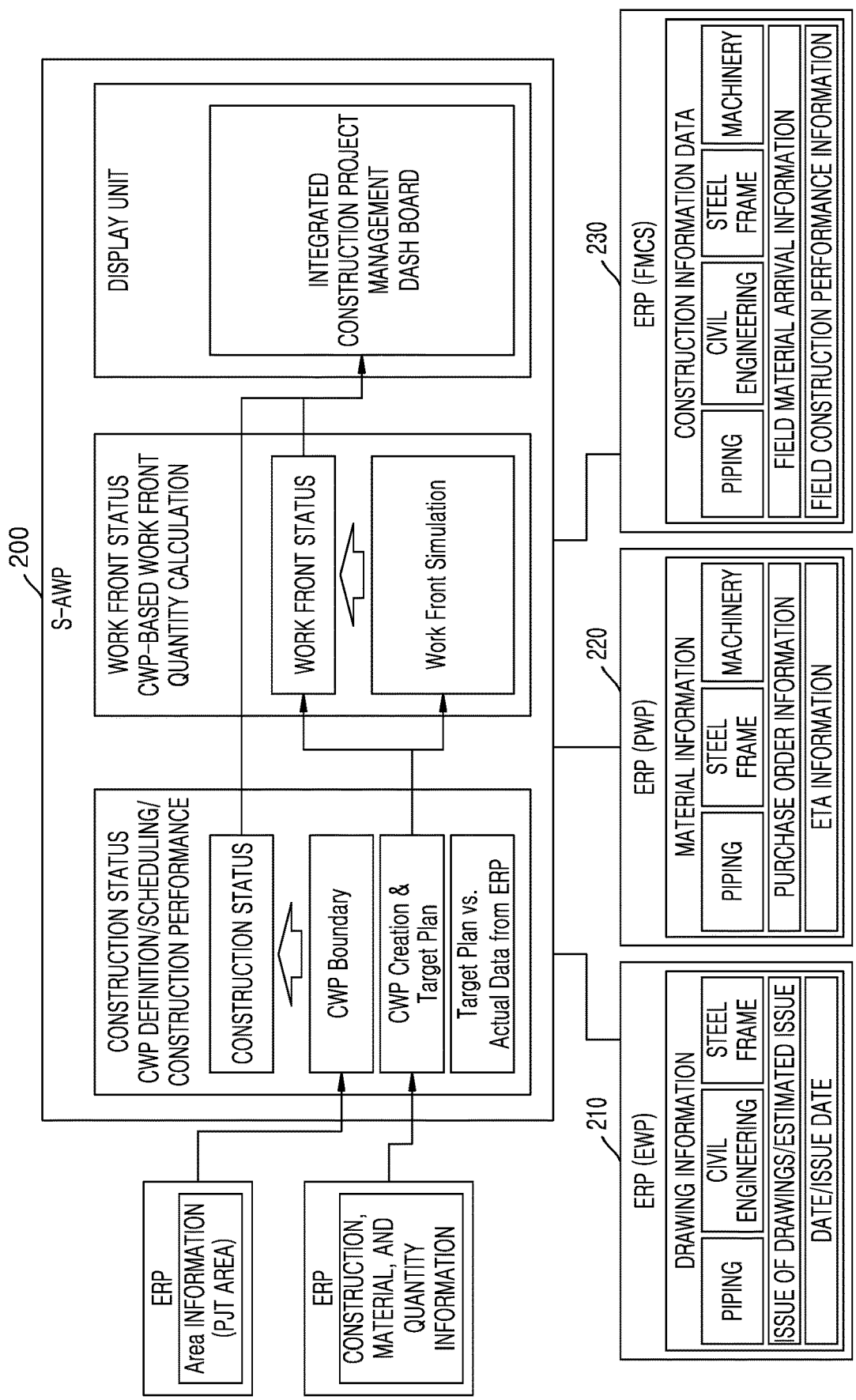
FIG. 2 illustrates a systemic view illustrating the project management device according to a preferred embodiment of the present disclosure.

FIG. 1 is a view illustrating an internal configuration of a project management device 100 according to a preferred embodiment of the present disclosure. FIG. 2 is a systematic view illustrating the project management device 100 according to a preferred embodiment of the present disclosure.

The project management device 100 may provide a platform for automatically collecting and sharing drawing data 210, material data 220, and construction information data 230 through an enterprise resource planning (ERP) database that is used by persons in charge of design, procurement, and construction for managing a construction project. The project management device 100 may calculate a work front quantity (constructible quantity) by performing a construction management in advance based on collected work data, and may prepare a construction schedule based on the calculated quantity.

In a preferred embodiment of the present disclosure, the project management device 100 includes a division unit 110 and a display unit 120.

Figure 13:
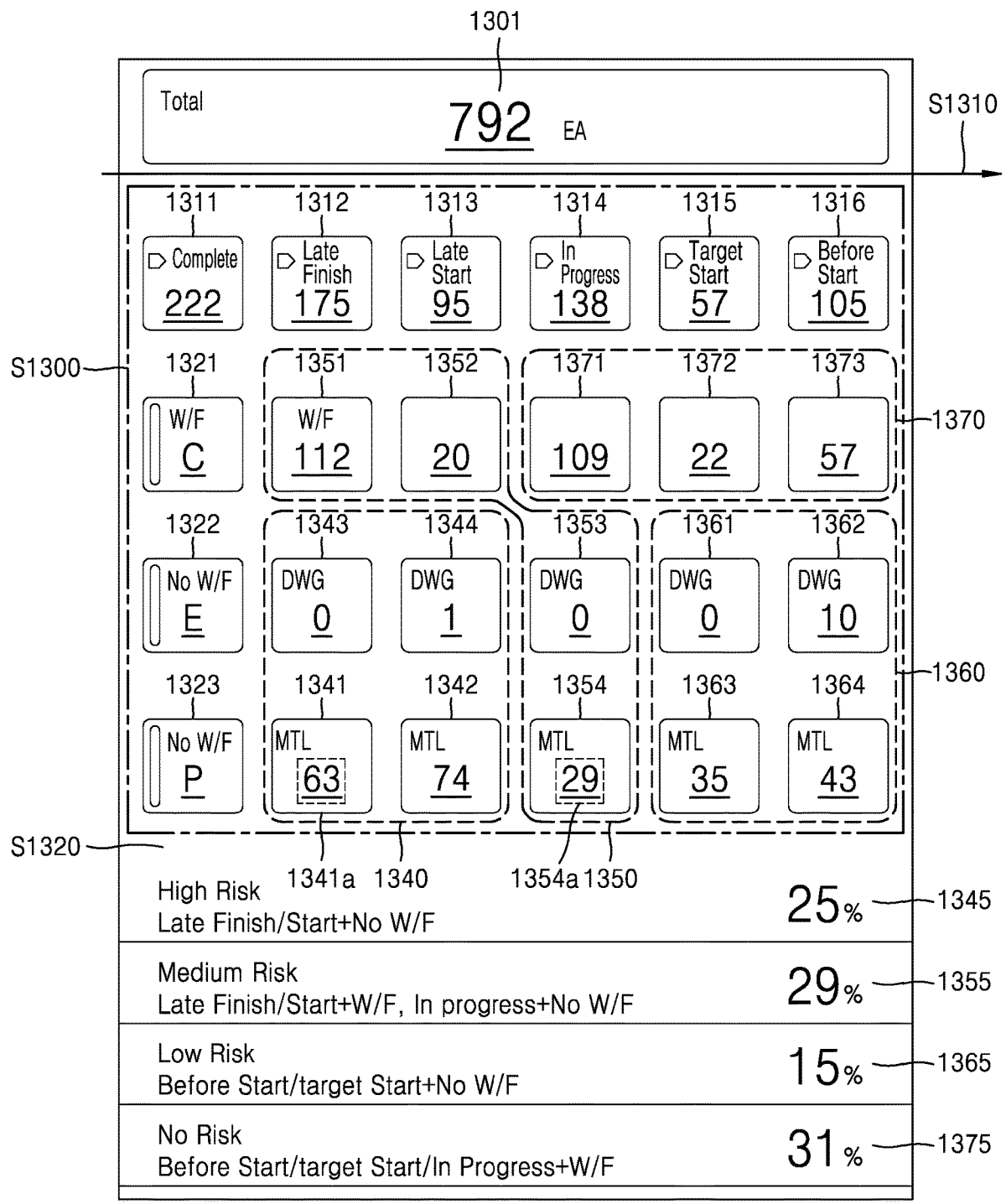
FIGS. 13 to 15 are views illustrating a display unit of the project management device according to preferred embodiments of the present disclosure.
Figure 14:
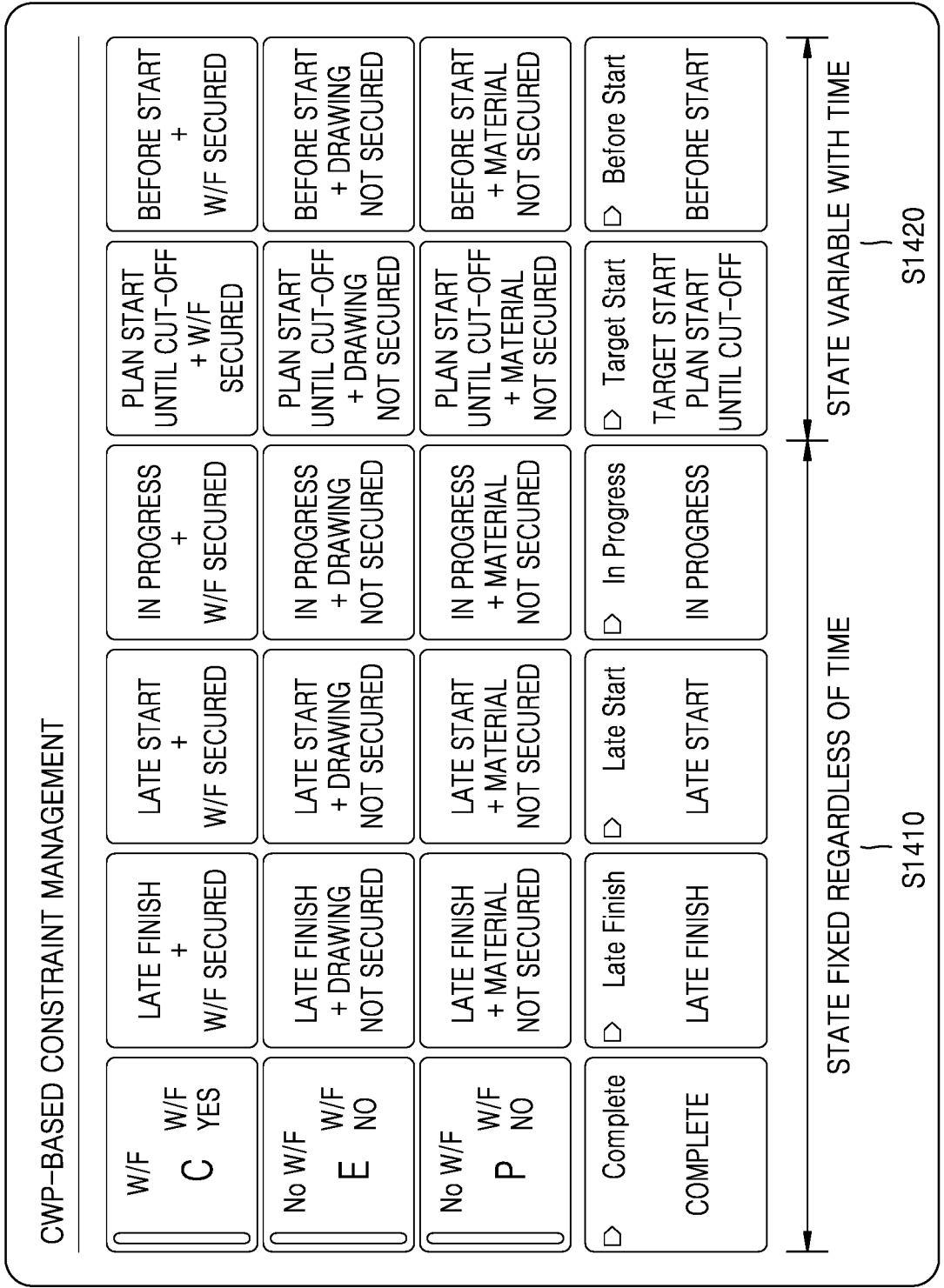
Figure 15:
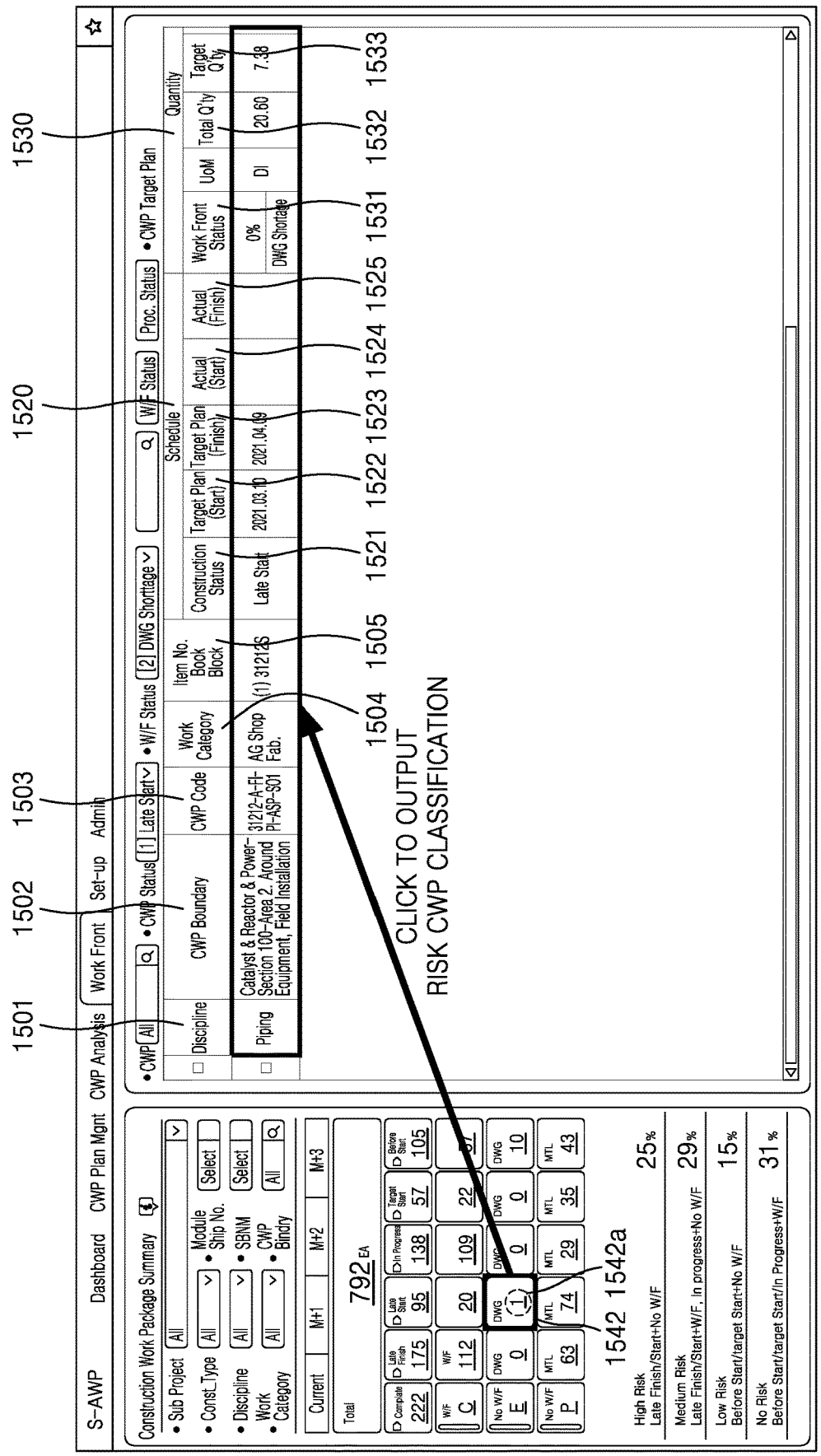

The division unit 110 divides a project into n sub-projects (construction work packages: CWPs) based on the construction type of the project, minimum unit areas for managing the project, and design information. The display unit 120 classifies the n CWPs based on a construction status and a work front status (constructible quantity status) and displays the n CWPs in a grid form. Examples of the display unit 120 are shown in FIGS. 13 to 15.

Figure 3A:
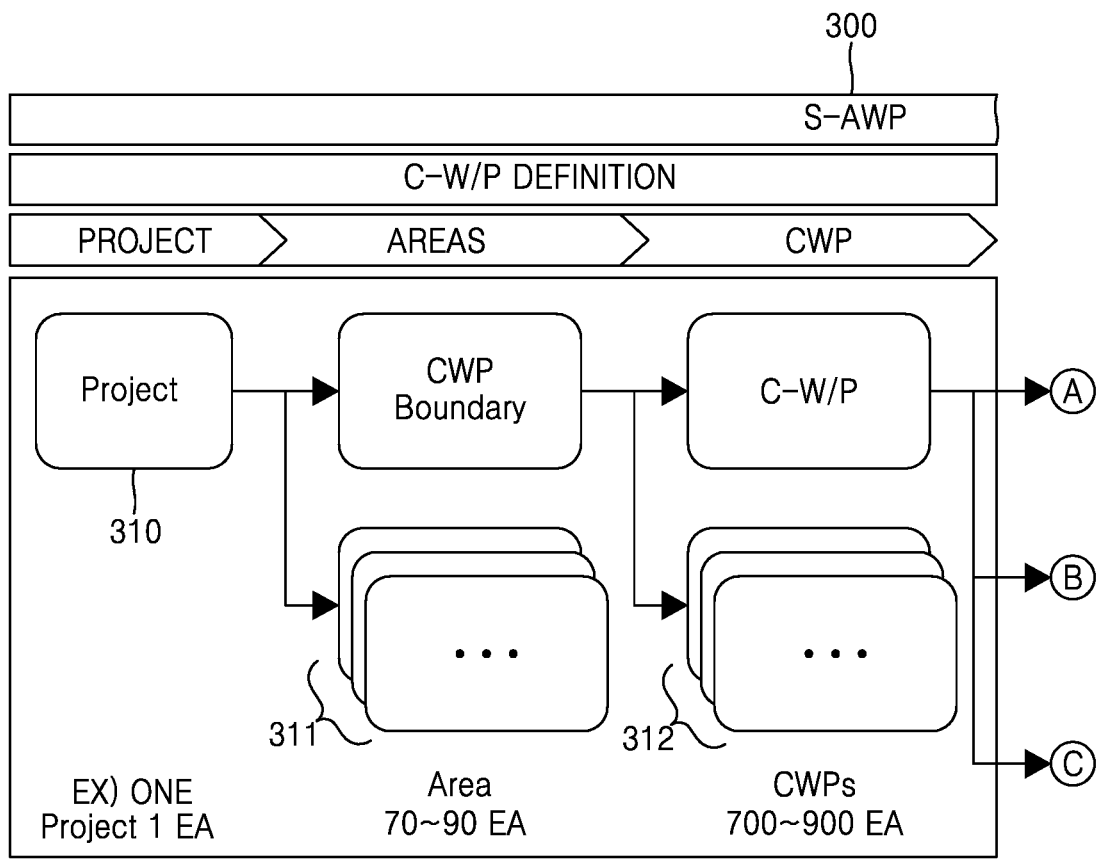
FIGS. 3A to 3C are views illustrating the order and criteria for calculating construction statuses in the project management device according to a preferred embodiment of the present disclosure.
Figure 3B:
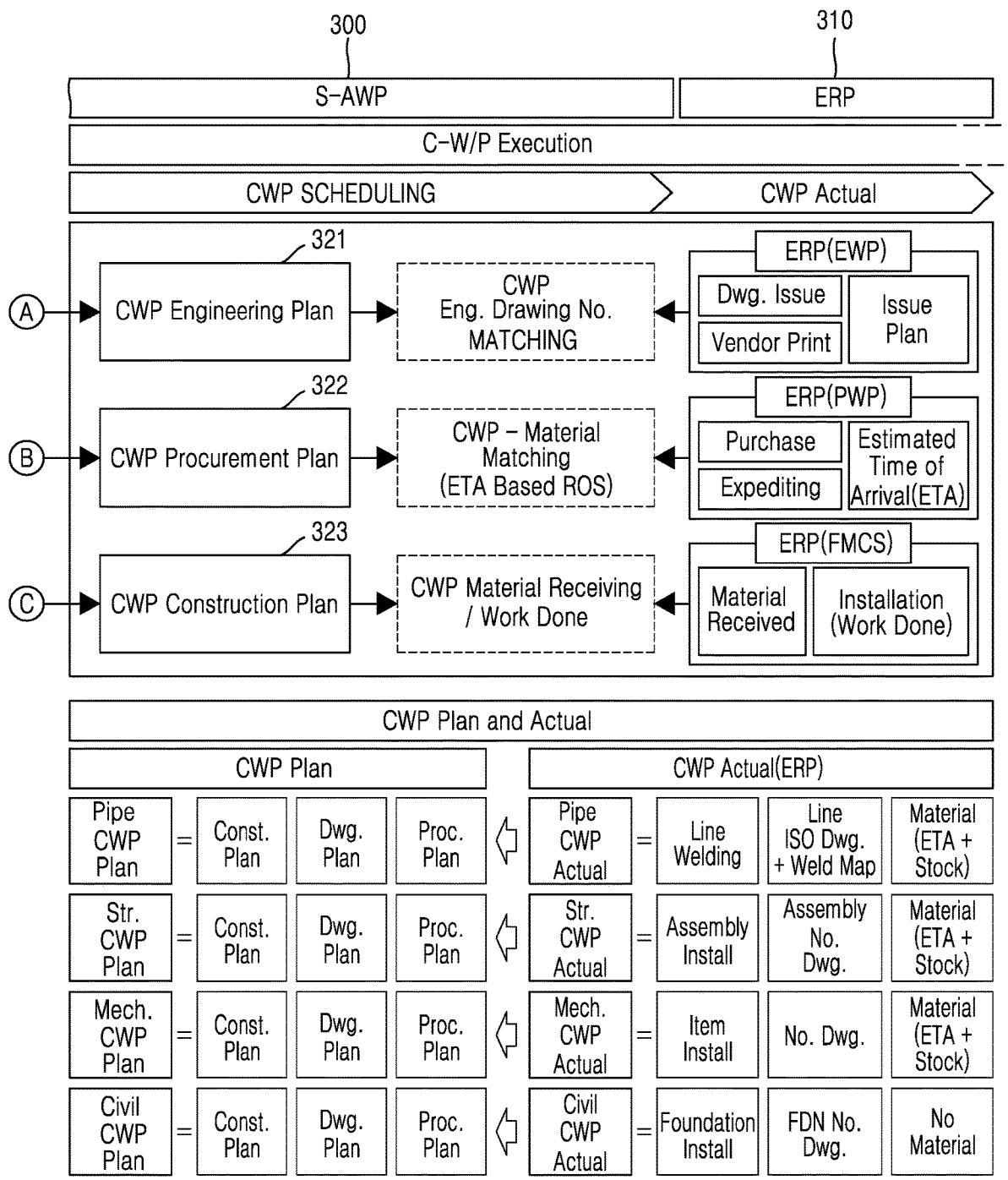
Figure 3C:
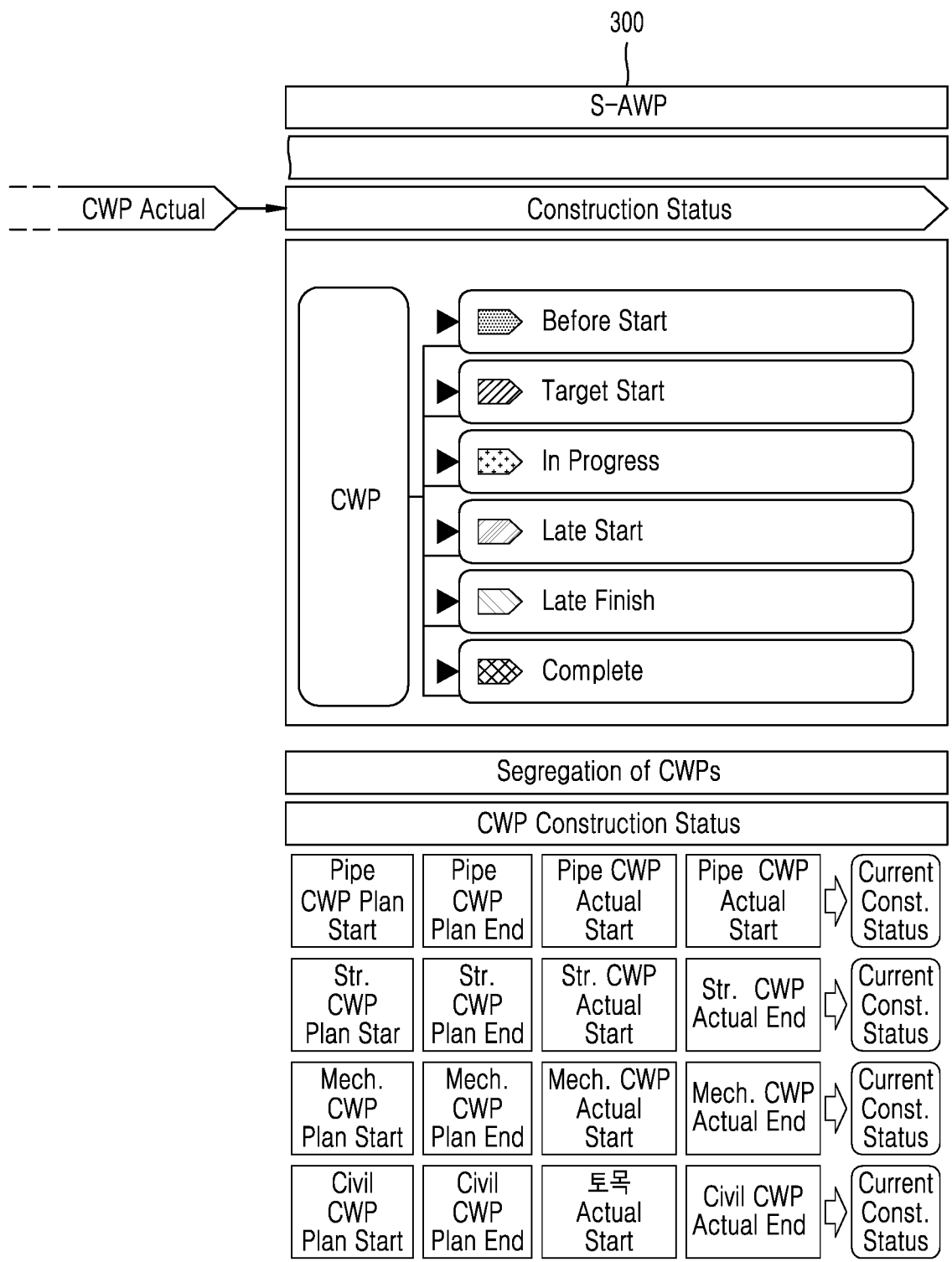

In a preferred embodiment of the present disclosure, the CWPs may be used as basic units of project management. Referring to Table 1, each of the CWPs may be defined as a set of individual constituent units. Referring to FIGS. 3A to 3C, for example, one construction project 310 may be divided into 70 to 90 CWPs 311 based on minimum unit areas, and then into 700 to 900 CWPs 312 based on design information. Identification codes may be allocated to the CWPs 312 for distinguishment. In addition, each CWP may be mapped with information about a zone to which the CWP belongs and a project to which the CWP belongs.

TABLE 1

| Construction types | Project area | Based on design information (drawing) (=individual constituent units) | Based on one CWP definition (a set of individual constituent units) | Meanings |
|---|---|---|---|---|
| Piping | Common | Line | Construction scale: about 4,000 Mhr Line bundle | 1 CWP = n Lines |
| Steel frame | | Assembly | Construction scale: about 4,000 Mhr Assembly bundle | 1 CWP = n assemblies |
| Machinery, equipment | | Item | Construction scale: about 4,000 Mhr Item bundle | 1 CWP = n items |
| Civil engineering | | Foundation | Construction scale: about 4,000 Mhr Foundation bundle | 1 CWP = n foundations |

In Table 1, Mhr refers to the amount of work which one person does per hour.

In a preferred embodiment of the present disclosure, a database may automatically collect plans 321, 322, and 323 established for the CWPs. In the example shown in FIG. 4, criteria for a construction plan 410, a design plan 420, and a procurement plan 430 are based on CWPs. Each of the CWPs is planned based on the same design information. In this case, the design information may be information on individual constituent units 401 such as lines, assemblies, items, and foundations.

When plans are established for each of the CWPs as shown in FIG. 4, performance information input by persons in charge of design, construction, and procurement is automatically collected in an ERP database according to the plans. An example of collecting performance information in a database ERP is shown in FIG. 5. A project management device S-AWP performs matching with the performance information which is automatically collected through the ERP database.

As in the example shown in FIG. 5, when results of performance are input by each person in charge to individual constituent units 501 of a company database ERP 500 and are collected, the construction statuses of CWPs may be classified according to the collected results of performance. Based on the construction statuses of the CWPs, as in the embodiment shown in FIGS. 9A and 9B, the construction statuses of the respective individual constituent units of the CWPs are collected (S910), and results thereof are output on a CWP basis (S920). As shown in Table 2, the construction status of each CWP may be shown based on monthly cut-offs: a progress status based on a future cut-off as well as a progress status of this month based on today.

Figure 9A:
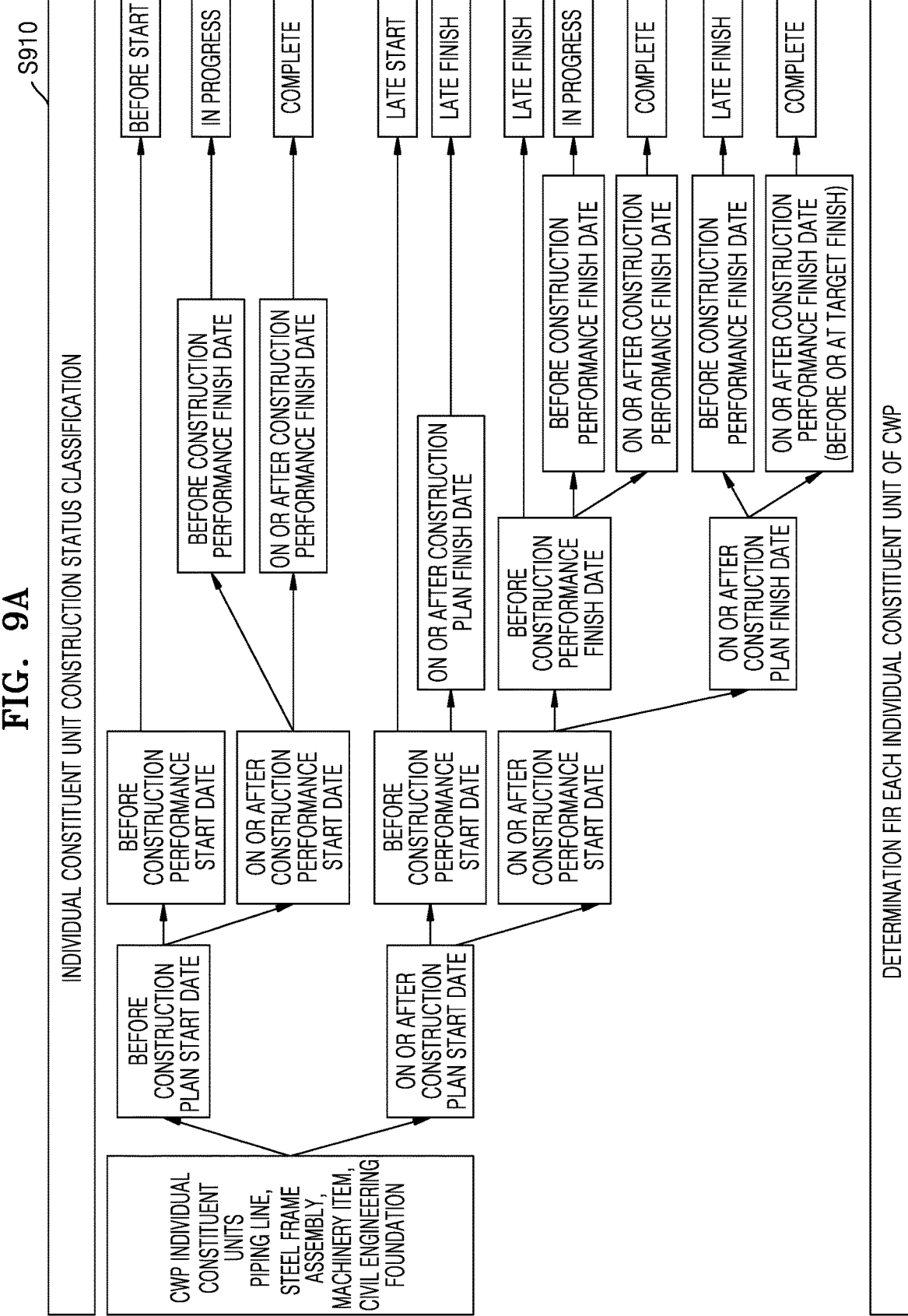
FIGS. 9A and 9B are views illustrating an example of determining a construction status on a CWP basis after determining construction statuses of individual constituent units, according to a preferred embodiment of the present disclosure.
Figure 9B:
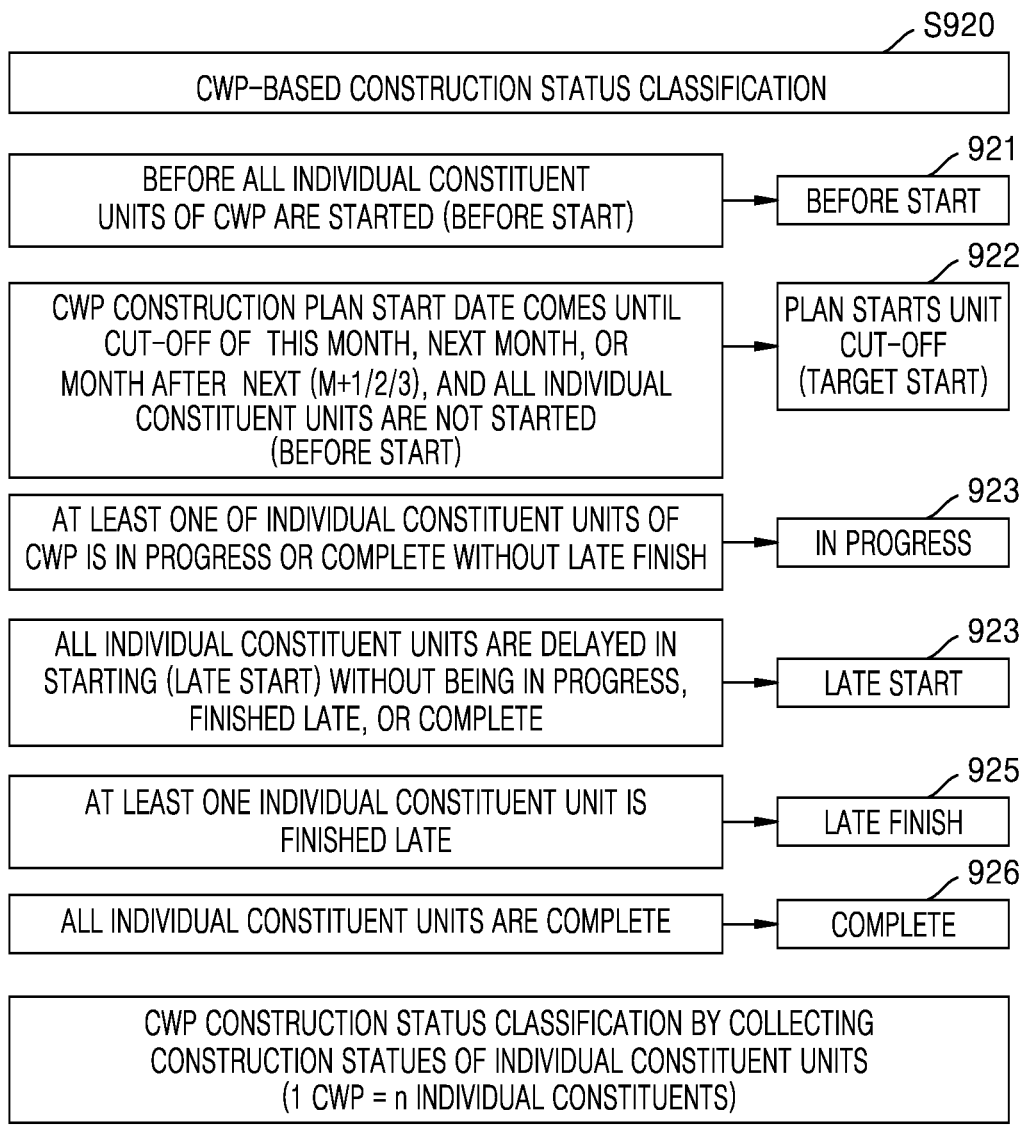

Referring to FIGS. 9A and 9B, the project management device S-AWP may divide the construction schedule of a CWP into six stages 921 to 926. The construction status of each CWP shown in FIG. 4 may also be used for filtering CWPs based on a cut-off. The six stages shown in FIGS. 9A and 9B are "Before Start" 921, "Target Start until Cut-off" 922, "In Progress" 923, "Late Start" 924, "Late Finish" 925, and "Complete" 926. "Before Start" 921 refers to a state in which all individual constituent units of the CWP are not started. "Target Start until Cut-off" 922 refers to a state in which the start date of a CWP construction plan is until a cut-off of, for example, this month M, next month M+1, the month after next M+2, or the like, and all individual constituent units are not started. "In Progress" 923 refers to a state in which at least one of the individual constituent units of the CWP is progressing or complete without Late Finish. "Late Start" 924 refers to a state in which all individual constituent units are delayed in starting and thus there is no delay in progress, no delay in termination, or no termination. "Late Finish" 925 refers to a state in which one or more individual constituent units are delayed in termination. Finally, "Complete" 926 refers to a state in which all individual structural units are complete.

FIG. 6 shows necessary data 610 and result data 620 required to output a work front status (constructionable quantity status) according to a preferred embodiment of the present disclosure. The project management device S-AWP may calculate a future work front status 612 independently based on a current cut-off and a future cut-off by using a current work front status 611 indicating prepared drawings and materials, and an estimated time of arrival (ETA) of materials and an expected drawing issue date 613 that are future-based data. The current work front status 611 refers to a quantity available for starting construction, and the future

TABLE 2

| | | | | | |
|---|---|---|---|---|---|
| Data for automatic classification of construction statues | | | | | |
| Individual constituent units | Construction plan start date | Construction plan finish date | Construction performance start date | Construction performance finish date | Today's date |
| CWP-based | Construction statuses of individual constituent units Daily cut-off date Present (this month): output based on today's date Future: output based on monthly cut-off after this month | | | | | front work status 612 is used for determining the priorities of designs and procurement work.

For proactive construction management, the project management device S-AWP calculates a work front quantity for each construction type based on construction, design, and procurement information collected from each ERP database. A work front status 621 is determined by comparing a CWP-based construction plan with a CWP-based work front quantity.

A target plan (construction plan) is established for each CWP by calculating a daily target construction quantity from a total construction quantity plan allocated for a period between the start and finish dates of the target plan and a today's target construction quantity. The daily target construction quantity may be determined by "planned total construction quantity/(start date of target plan−end date of target plan)." However, the daily target construction quantity may vary depending on a distribution method. A cumulative daily target construction quantity refers to a cumulative daily target construction quantity based on today.

CWP work fronts may be determined using different pieces of information according to characteristics of construction types. As shown in FIG. 7, according to characteristics of construction types, CWP work fronts may be classified into a first work front type 710 (type 1) considering drawings and materials, a second work front type 720 (type 2) considering only materials, and a third work front type 730 (type 3) considering only drawings. As shown in FIG. 8, a CWP work front may be calculated through an operation 810 of calculating work fronts of individual constituent units according to construction types and an operation 820 of adding up the work fronts 810 on a CWP basis.

Figure 10A:
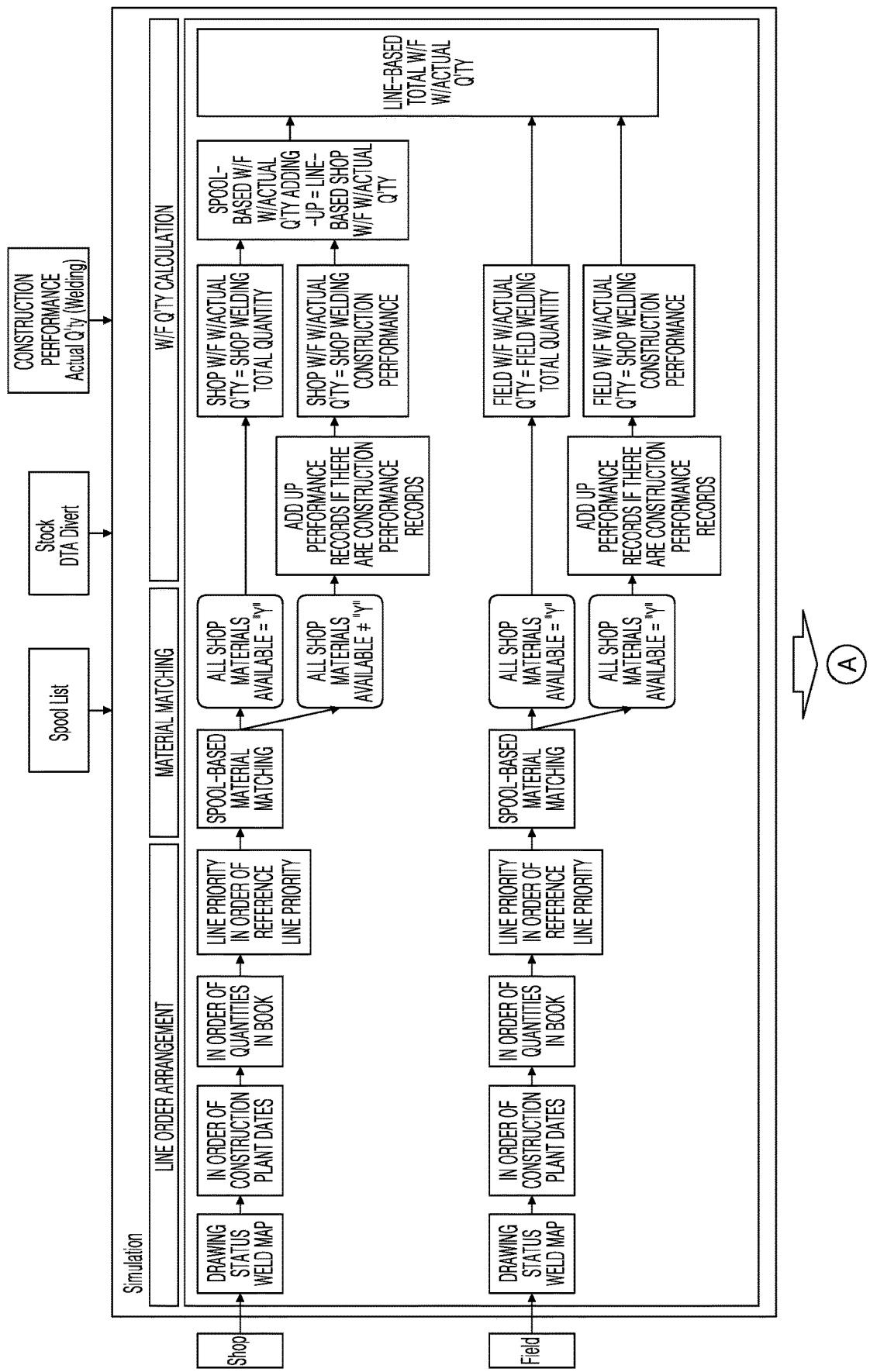
FIGS. 10A to 10C are views illustrating an example in which three simulations are sequentially performed according to the order of drawings (3D, ISO, and Weld map) with respect to a line, which is an individual constituent unit, for calculating a future construction quantity according to a preferred embodiment of the present disclosure.
Figure 10B:
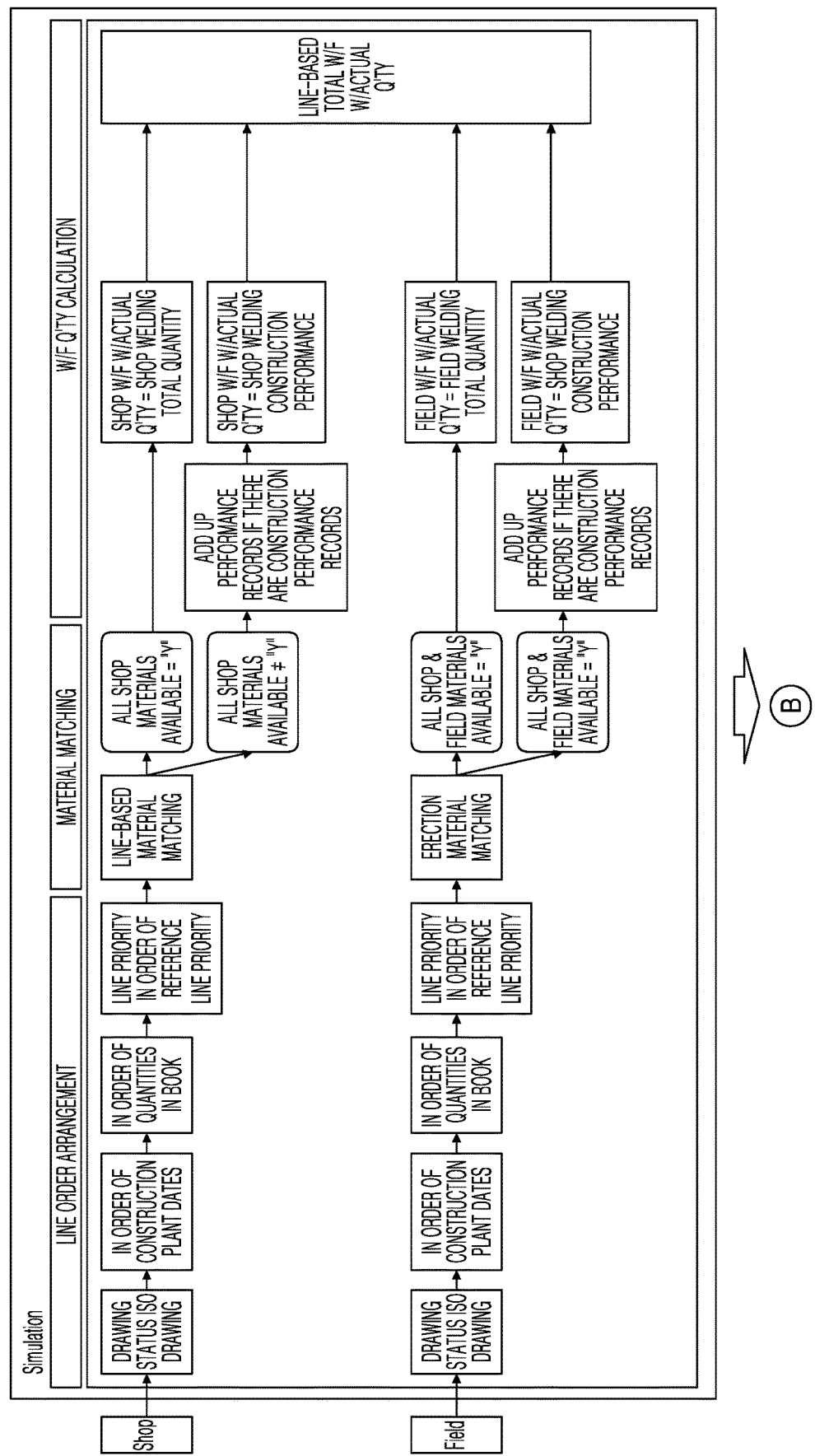
Figure 10C:
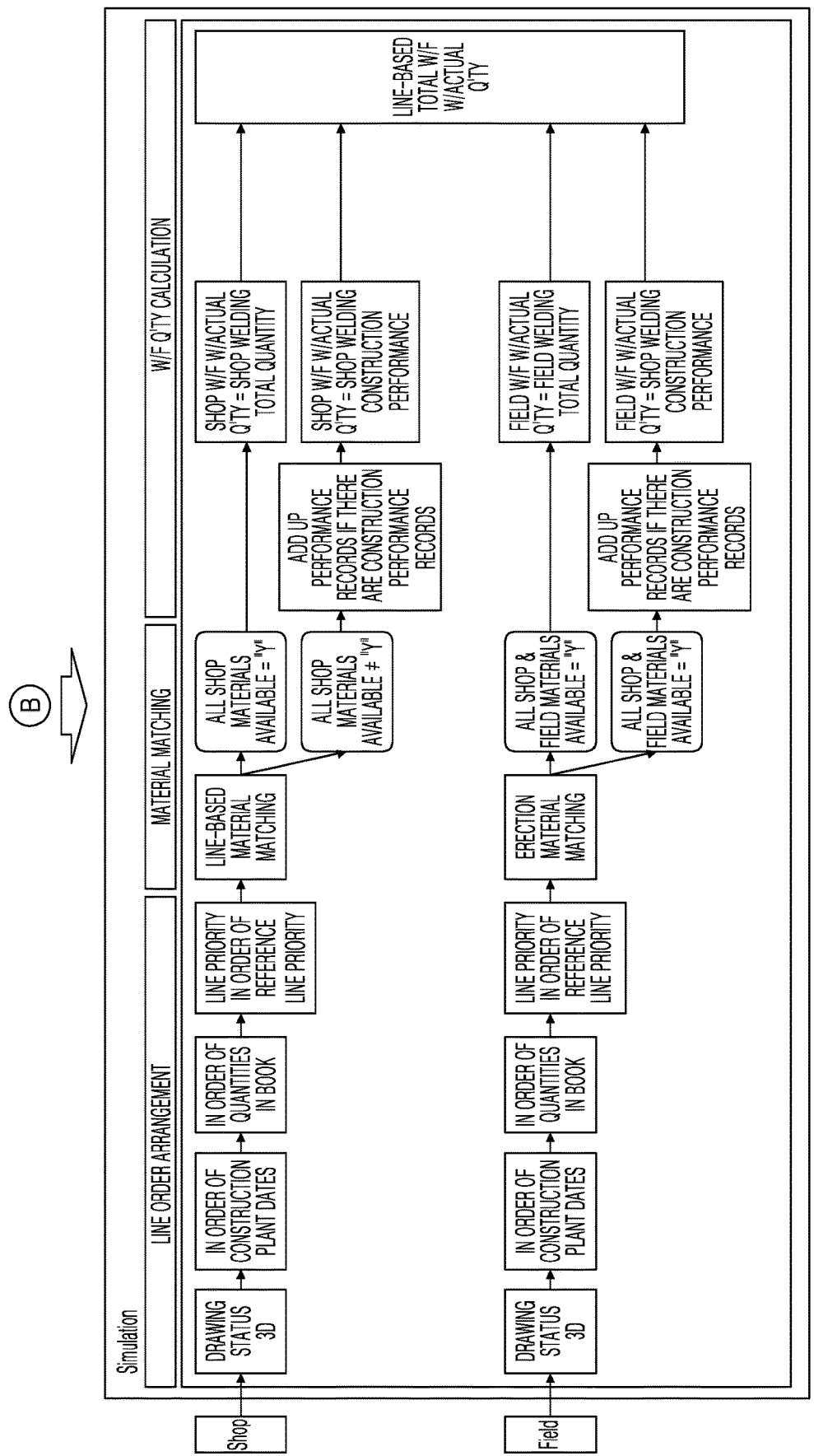

An example of calculating work fronts according to individual constituent units is as follows. FIGS. 10A to 10C shows an example in which a future construction quantity is calculated according to a preferred embodiment of the present disclosure by performing three sequential simulations according to the order of drawings (3D, ISO, and weld map) for lines which are an individual constituent units. Referring to FIGS. 10A to 10C, in an example of piping construction, the priority of construction of lines, which are individual constituent units, is set between the start date and the end date of a piping CWP plan. In addition, after collecting information on the drawing status, material list (BOM), and welding quantity of each line from ERP, a weld map is prepared using the information through the statuses shown in Table 3. In Table 3, "Spool" refers to line segment units for line manufacturing and construction when the weld map is output, and "Joint" refers to weld joint zones indicated in the weld map for actual construction.

TABLE 3

| Line-based drawing statuses | Description | Drawings | Units | Design (drawing) information |
|---|---|---|---|---|
| 3D | Before line drawing preparation | X | Line | Line-based necessary materials (BOM) Welding quantity (temporary quantity) calculated based on materials |
| ISO Drawing | Before detailed construction drawing preparation | ○ | Line | Line-based necessary materials (BOM) Welding quantity (temporary quantity) calculated based on materials |
| Weld Map (Shop Drawing) | Detailed drawing state for actual construction | ○ (for construction) | Line segment Spool unit | Spool list of line-based segments Spool-based necessary materials (BOM) Spool-based welding positions and list Welding quantity (actual quantity) calculated based on joints |

When the weld map is prepared, piping work fronts are calculated for a shop and a field. Material lists are prepared individually for the shop and the field, and materials to be excluded from calculation simulation are set. The construction quantity calculation may be performed separately for the future and the present. A future-based calculation and a present-based calculation are performed by using different pieces of design information and different pieces of procurement information in simulations as shown in Table 4.

Table 4 shows, as an example, data required for calculating a future construction quantity status and a current construction quantity status. Table 5 shows, as an example, weld map material matching for calculating a construction quantity status based on the future. Table 6 shows, as an example, matching of ISO drawings and 3D materials for calculating a construction quantity status based on the future. Table 7 shows result data obtained by calculating a construction quantity status based on the future. Table 8 shows references for future construction quantity calculation.

TABLE 4

| | | | Information necessary for simulation | | |
|---|---|---|---|---|---|
| Simulation Reference | Proactive settings | Basic calculation methods | Drawing State | Design (drawing) information | Procurement (material) information |
| Future | Line priority + Shop/Field Materials + Simulation exception material reflection | Work front quantity = satisfying the following condition: Line-based (temporary) quantity sum + spool-based weld quantity sum | 3D (Line) | Line-based necessary materials (BOM) Welding quantity (temporary quantity) calculated based on materials | Arrived and Arrival-expected material list, and Receive date And Estimated time of arrival (ETA) |
| | | | ISO Drawing (Line) | Line-based necessary materials (BOM) Welding quantity | |

TABLE 4-continued

| | | | | Information necessary for simulation | |
|---|---|---|---|---|---|
| Simulation Reference | Proactive settings | Basic calculation methods | Drawing State | Design (drawing) information | Procurement (material) information |
| | | (materials necessary for each line in ISO and 3D states and materials necessary for each spool in weld-map state ∩ materials arrived and to be arrived) | Weld Map(Spool) | (temporary quantity) calculated based on materials Expected issue date/issue date of ISO drawings Spool list of line-based segments Spool-based necessary materials (BOM) Spool-based welding positions and list Welding quantity (actual quantity) Weld Map issue date | |
| Present | | Work front quantity = Satisfying the following condition: Spool-based Weld Quantity sum (materials necessary for spool in Weld Map State ∩ Arrived materials) | 3D (Line) ISO Drawings (Line) Weld Map (Spool) | unused unused Spool list of line-based segments Spool-based necessary materials (BOM) Spool-based welding positions and list Welding quantity (actual quantity) Weld Map issue date | Arrived material list and arrival date (Receive Date) |

TABLE 5

| Design information Line for which weld map is issued (Spool-based matching) | | | Procurement information (arrival, expected arrival) matching Field arrival (stock) 90' Elbow 12 EA + expected arrival (ETA) 3 EA |
|---|---|---|---|
| Line of first priority | Spool 1 materials for line of first priority | 90' Elbow 4EA needed | 4 EA Work Front/11 EA remains |
| | Spool 2 materials for line of first priority | 90' Elbow 5EA needed | 5 EA Work Front/6 EA remains |
| . . . | . . . | . . . | . . . |
| Line of second priority | Spool 1 materials for line of second priority | 90' Elbow 12EA needed | 12 EA allocation shortage/No Work Front |
| | Spool 2 materials for line of second priority | 90' Elbow 2EA needed | 2 EA Work Front/4 EA remains |
| . . . | . . . | . . . | . . . |

TABLE 6

| Design information ISO Drawing, Line in 3D state (Line-based matching) | | | Matching of procurement information (arrived, expected arrival) Field arrival (Stock) 90' Elbow 12 EA + Expected time of arrival (ETA) 3 EA |
|---|---|---|---|
| Line of first priority | Materials for line of first priority | 90' Elbow 4EA needed | 4 EA Work Front/11 EA remains |
| Line of second priority | Materials for line of second priority | 90' Elbow 5EA needed | 5 EA Work Front/6 EA remains |
| Line of third priority | Materials for line of third priority | 90' Elbow 12EA needed | 12 EA allocation shortage/No Work Front |

TABLE 6-continued

| Line of fourth priority | Materials for line of fourth priority | 90' Elbow 2EA needed | 2 EA Work Front/4 EA remains |
|---|---|---|---|
| ... | ... | ... | ... |

TABLE 7

| Drawing status | Work front conditions | Work front results |
|---|---|---|
| Weld Map | Materials for each spool Match all | Work Front Date = Matching Satisfaction Time<br>Work Front Quantity = Welding quantity (actual quantity) |
| ISO, 3D | Materials for each line match all | Work Front Date = Matching Satisfaction Time<br>Work Front Quantity = Welding quantity (temporary quantity) calculated based on materials |

TABLE 8

| | Material Matching Information | | | Work front quantity (W/F w/Actual) | | | Final result values |
|---|---|---|---|---|---|---|---|
| Units | drawing state | Welding Quantity | Material matching target | | Matching result values | | |
| Line | 3D/ISO Drawing | doesn't exist | Shop: Shop making materials Field: Field installation materials (Erection) + Spool List | matching satisfied | Application of conversation formula for each material ((temporary) quantity) 90 Elbow 28" - >56 DI Sum of converted quantities for materials > 0 | Construction performance No | Conversion summation for materials (temporary) Quantity |
| | | | | Matching dissatisfactory | 0 | Construction performance Yes | |
| Spool | Weld Map | Yes Welding Joint Quantity | Shop: Shop making materials Field: Field installation materials (Erection) + Spool List | Matching Satisfactory | Quantities of welding joints (actual quantities) Welding Joint Quantity Sum > 0 | Construction performance No | Welding Joint Sum Actual quantity |
| | | | | matching Dissatisfactory | 0 | Construction performance Yes | Welding Performance |

Figure 11A:
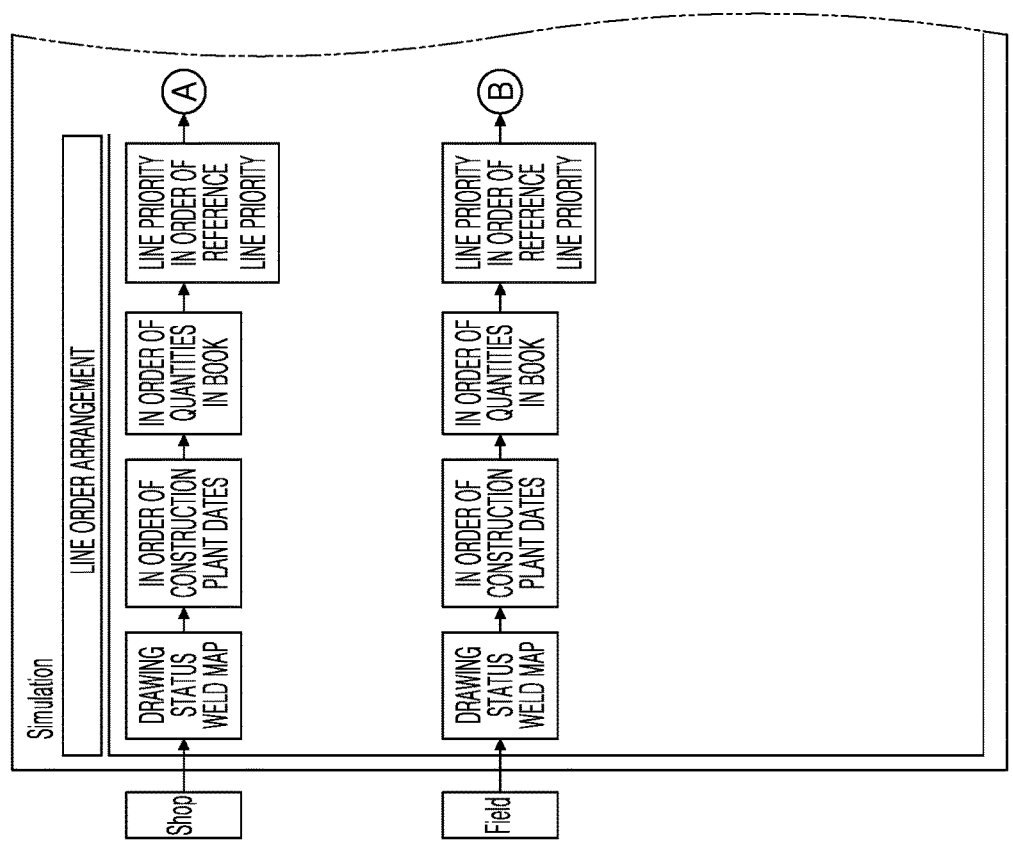
FIGS. 11A and 11B are flowcharts illustrating a process of simulating a current work front quantity according to a preferred embodiment of the present disclosure.
Figure 11B:
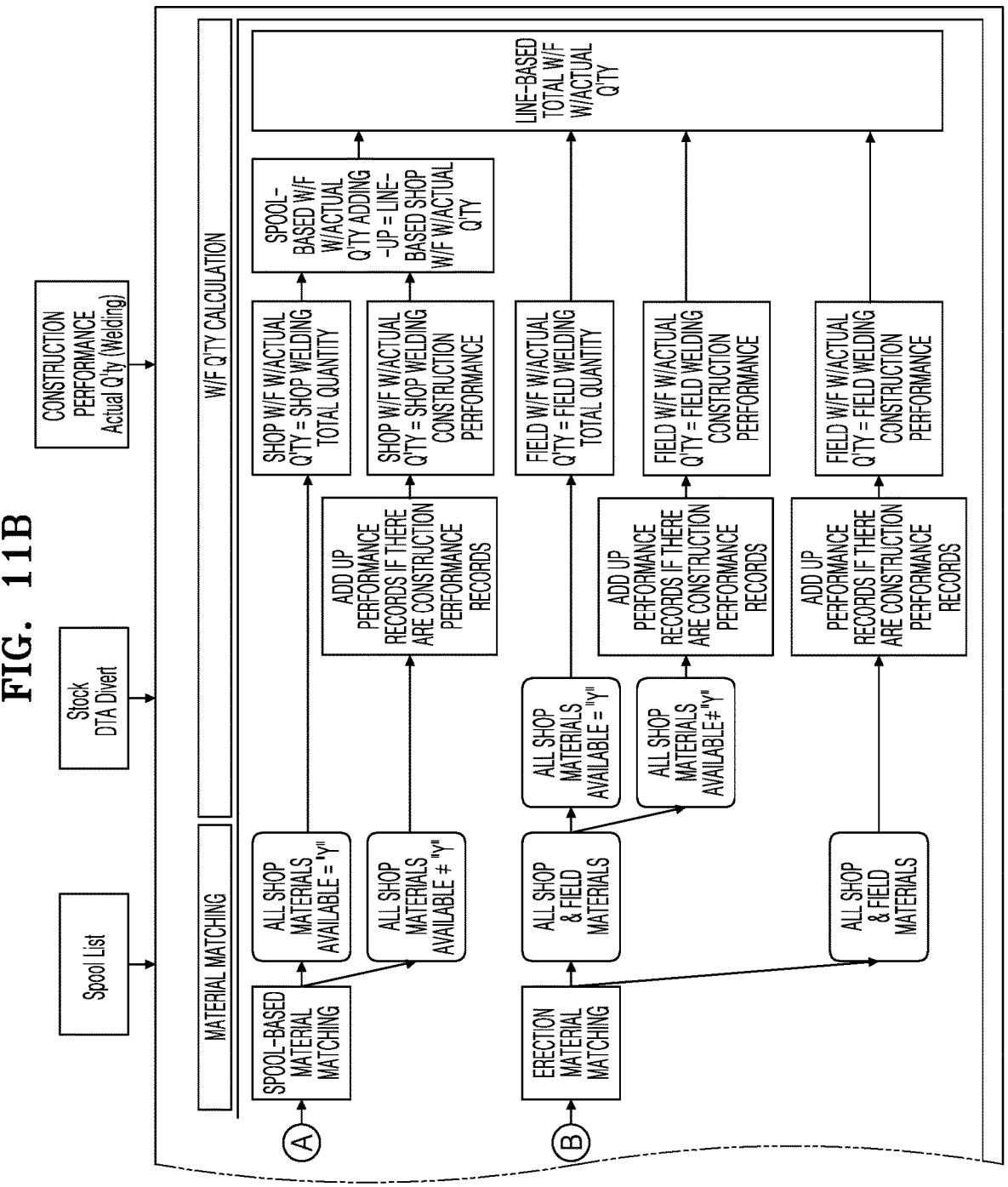

In a preferred embodiment of the present disclosure, a simulation may be performed using only a weld map when calculating a current construction quantity status. Table 8 shows an example in which procured and received materials are matched to lines according to priorities through a weld map simulation based on current individual constituent units. Table 9 shows, as an example, results of calculation of a current construction quantity status. Table 10 shows, as an example, results of current construction quantity calculation. Table 11 shows criteria for current construction quantity calculation. FIGS. 11A and 11B is a flowchart illustrating a process of simulating a current piping work front according to a preferred embodiment of the present disclosure. Even in steel frame, machinery, and civil engineering works, construction quantity statuses are calculated and classified based on individual constituent units.

TABLE 9

| Line for which Weld Map is issued (Spool-based matching) | | | Procurement information (arrival) matching Stock 90' Elbow 12 EA |
|---|---|---|---|
| Line of first priority | Spool 1 materials for line of first priority | 90' Elbow 4EA needed | 4 EA Work Front/8 EA remains |
| | Spool 2 materials for line of first priority | 90' Elbow 5EA needed | 5 EA Work Front/3 EA remains |

TABLE 9-continued

| | | | |
|---|---|---|---|
| ... | ... | ... | ... |
| Line of second priority | Spool 1 materials for line of second priority | 90' Elbow 12EA needed | 12 EA allocation shortage/No Work Front |
| | Spool 2 materials for line of second priority | 90' Elbow 2EA needed | 2 EA Work Front/1 EA remains |
| ... | ... | ... | ... |

TABLE 10

| drawing state | Place | Work Front Conditions | Work Front Results |
|---|---|---|---|
| Weld Map | Shop | Materials necessary for each spool match all | Work Front Date = Matching Satisfaction Time Work Front Quantity = Welding quantity (actual quantity) |
| | Field | Shop production completed Spool Materials necessary for each line match all | |

TABLE 11

| | Material Matching Information | | | | | |
|---|---|---|---|---|---|---|
| drawing state | Welding Quantity | Material Matching Target | Matching result values | | Work front quantity (W/F w/Actual) | final result values |
| Weld Map | Yes Welding Joint Quantity Yes | Shop: Shop manufactured materials Field: Field installation materials (Erection) + Spool List | matching satisfactory | Quantities of welding joints (actual quantities) Welding Joint Quantity Sum > 0 | Construction performance No | Total Welding Joint Quantity |
| | | | Matching Dissatisfactory | 0 | Construction performance Yes | Welding performance |

The display unit 1300 includes a group of grid boxes indicating only construction statuses, and each of the grid boxes contains information on the number of CWPs belonging to a corresponding construction progress stage. For example, FIG. 13 shows a group of six grid boxes: "Complete" 1311, "Late Finish" 1312, "Late Start" 1313, "In Progress" 1314, "Target Start" 1315, and "Before Start" 1316. Referring to FIG. 13, among the 792 CWPs 1301, 175 CWPs are in "Late Finish" 1312, 95 CWPs are in "Late Start" 1313, 138 CWPs are in "In Progress" 1314, 57 CWPs are in "Target Start" 1315, and 105 CWPs are in "Before Start" 1316.

Figure 12A:
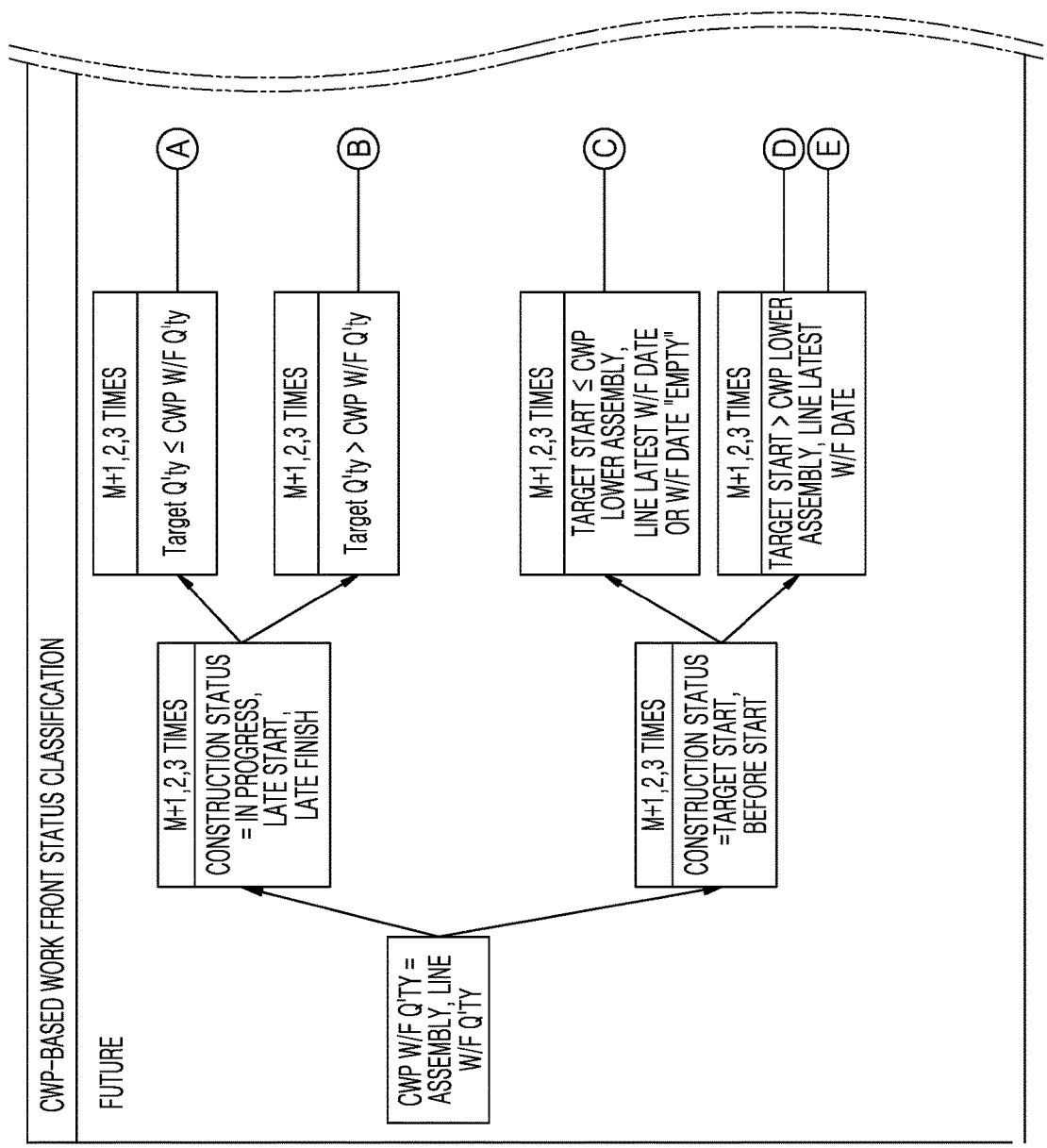
FIGS. 12A and 12B are views illustrating an example in which work front statuses of CWPs for piping and steel frames are classified according to Work Front Type 1 based on the future, according to a preferred embodiment of the present disclosure.
Figure 12B:
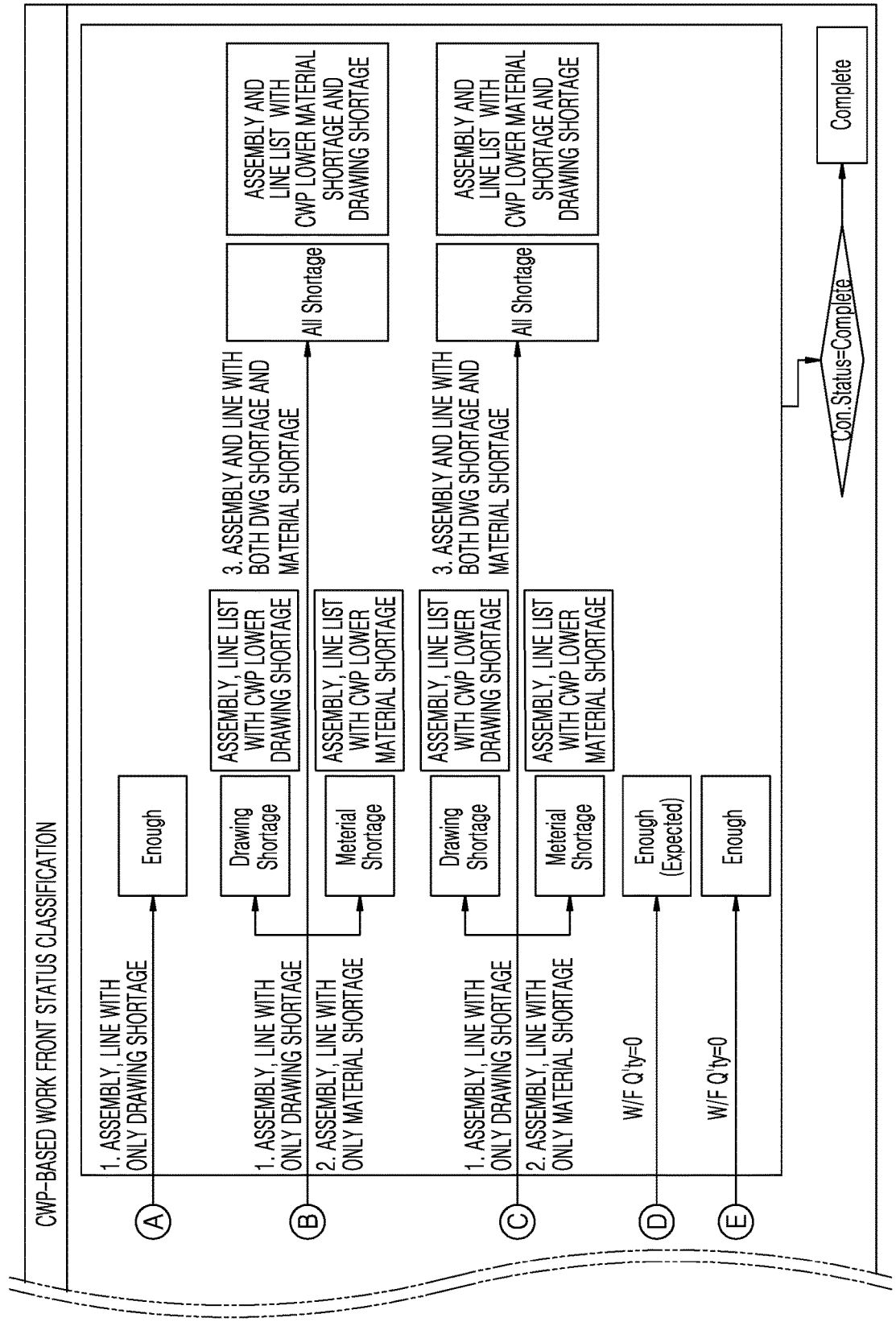

After construction quantity statuses are calculated and classified based on individual constituent units in steel frame, machinery, and civil engineering works, work fronts are classified on a CWP basis. In this case, as shown in the example of FIG. 8, work front types are classified and applied according to construction types. FIGS. 12A and 12B show examples in which work front statuses based on the future and the present are classified as work front type 1 on a CWP basis in piping and steel frame works according to preferred embodiments of the present disclosure.

FIGS. 13 to 15 show a display unit of the project management device according to preferred embodiments of the present disclosure.

An example in which CWPs are classified and displayed in a grid form based on a construction status and a work front status will be described with reference to FIGS. 13 and 14.

A display unit S1300 classifies n CWPs based on a construction status S1310 and a work front status S1320 and displays the CWPs in a grid form. FIG. 13 shows an example in which 792 CWPs 1301 are classified based on construction statuses and work front statuses. In FIG. 13, the horizontal axis of the grid form indicates construction statuses S1310 according to stages, and the vertical axis of the grid form indicates work front statuses S1320 according to stages. Referring to FIG. 14, in the rightward direction along the horizontal axis (x-axis), construction statuses S1410 of started constructions are shown, and then construction statuses S1420 of non-started constructions are shown.

"Complete" 1311 refers to completion in performance. "Late Finish" 1312 refers to a state in which "Target Plan Finish" has come in the plan but the completion of at least one individual constituent unit is delayed in terms of performance. Among individual constituent units, Foundation refers to a civil engineering work, Assembly refers to a steel frame work, Item refers to machinery, and Line refers to piping. "Late Start" 1313 refers to a state in which "Target Plan Start" has come in the plan but the start of all individual constituent units is delayed in terms of performance. "In Progress" 1314 refers to a state in which "Target Plan Start" has come or has not yet come until a cut-off of this month, next month, or the month after next (M+1/2/3), and the construction of at least one individual constituent unit has started or completed in terms of performance. "Target Start" 1315 refers to a state in which "Target Plan Start" has come in the plan but construction has not been started in terms of performance. In addition, "Before Start" 1316 refers to a state in which "Target Plan Start" has not come in the plan, and construction has not been started in terms of performance.

The work front statuses S1320 are classified into "W/F C" 1321, "No W/F E" 1322, and "No W/F P" 1323.

"W/F C" 1321 refers to CWPs that are enough in work front, "No W/F E" 1322 refers to CWPs having drawing shortage or all shortage in work front, and "No W/F P" 1323 refers to CWPs having a material shortage or all shortage in work front.

In a preferred embodiment of the present disclosure, each grid box shows information on a construction status and a work front status. In addition, each grid box shows information on the number of CWPs having the construction status and the work front status.

For example, a first grid box 1341 indicates "Late Finish" as a construction status, "No W/F P" 1323 as a work front status, and 63 (1341*a*) as the number of CWPs. In a preferred embodiment of the present disclosure, risk levels may be known from the positions of grid boxes in the grid form.

Grid boxes 1341, 1342, 1343, and 1344 included in a first region 1340 of a grid board 1330 have High Risk 1345. In FIG. 13, among the 792 CWPs, 570 CWPs are in progress except for 222 CWPs that have been completed. Among the 570 CWPs, 138 CWPs are included in the first region 1340. That is, about 25% of the 570 CWPs are classified as high-risk CWPs. Grid boxes 1351, 1352, 1353, and 1354 included in a second region 1350 have Medium Risk 1355. In FIG. 13, among the 570 CWPs which are in progress, 161 CWPs are included in the second region 1350. That is, about 29% of the 570 CWPs are classified as medium-risk CWPs. Grid boxes 1361, 1362, 1363, and 1364 included in a third region 1360 have Low Risk 1365. In FIG. 13, among the 570 CWPs which are in progress, 78 CWPs are included in the third second region 1360. That is, about 15% of the 570 CWPs are classified as low-risk CWPs. Grid boxes 1371, 1372, and 1373 included in another region 1370 have No Risk 1375. In FIG. 13, about 31% of the 570 CWPs which are in progress are classified as no-risk CWPs.

In a preferred embodiment of the present disclosure, the grid board 1330 may show the first region 1340, the second region 1350, the third region 1360, and the other region 1370 with different colors.

FIG. 15 illustrates an example in which grid boxes of a display unit have a filtering function according to a preferred embodiment of the present disclosure. When information 1542*a* indicating the number of CWPs in a grid box 1542 of a grid board is clicked, only a CWP corresponding to the grid box 1542 is selected from n CWPs by filtering, and detailed information on the CWP is displayed. When a plurality of CWPs are selected by filtering, detailed information on each of the plurality of CWPs is displayed. The detailed information includes a construction type 1501, a CWP boundary 1502 indicating a minimum unit area for project management, a CWP identification code 1503 for identifying each CWP, a CWP category 1504, an individual constituent unit identification number 1505, construction schedule information 1520, and material quantity information 1530. The construction schedule information 1520 includes information on a construction status 1521, a target plan start date 1522, a target plan finish date 1523, an actual construction start date 1524, and an actual construction finish date 1525. The material quantity information 1530 includes a work front status information 1531, total material quantity information 1532, and target material quantity information 1533.

Methods according to embodiments of the present disclosure may be implemented in the form of program instructions executable on various computers and may be recorded on a computer-readable medium. The computer-readable medium may store one or a combination of program instructions, data files, data structures, and the like. The program instructions recorded on the computer-readable medium may be specially designed and prepared for the present disclosure, or may be known and available to those skilled in the art of computer software.

While embodiments of the present disclosure have been described with reference to the accompanying drawings, the present disclosure is not limited to the embodiments, and those of ordinary skill in the art may make various changes in form and details therein.

The invention claimed is:

1. A project management device comprising:
a division unit configured to divide a project into n construction work packages (CWPs) based on a construction type constituting the project, a minimum unit area for managing the project, and design information; and
a display unit that is separated into three distinct areas including (1) a first area displaying a total number of CWPs, (2) a second area displaying a grid board in which the n CWPs are displayed in a grid form, and (3) a third area displaying classifications of work front statuses,
wherein the second area of the display unit includes at least four distinct regions in which grid boxes are positioned, each region of the four distinct regions being associated with a different risk level;
wherein a horizontal axis of the grid form indicates stage-based construction statuses, and a vertical axis of the grid form indicates stage-based work front statuses,
wherein each of grid boxes of the grid form indicates information on a construction status and a work front status, and information on the number of CWPs having the construction status and the work front status,
wherein in a rightward direction along the horizontal axis, a construction status of a started construction is shown, and then a construction status of a non-started construction is shown,
wherein the construction type includes piping, a steel frame, machinery, and civil engineering, and the work front statuses are calculated separately based on present and future,
wherein when the work front statuses are calculated based on the future, work front statuses of individual constituent units are calculated by matching a procurement arrival and a scheduled material to a line set according to priority through three independent sequential simulations, and then the work front statues of the individual constituent units are added up on a CWP basis to obtain CWP-based work front statuses, and
wherein the three independent sequential simulations are performed in an order of: a weld map that is a detailed drawing for performing an actual construction based on the line, which is an individual constituent unit of piping; an ISO drawing that is a drawing before preparing a detailed construction drawing; and 3D that is a drawing before preparing a line drawing.

2. The project management device of claim 1, wherein when the information on the number of CWPs in each of the grid boxes is clicked, only CWPs corresponding to the grid box are selected from the n CWPs by filtering, and detailed information on the selected CWPs are shown.

3. The project management device of claim 1, wherein the display unit further comprises a group of grid boxes indicating only construction statuses, the grid boxes of the group comprise information on the number of CWPs having the construction statues.

4. The project management device of claim 1, wherein when calculating the work front statuses based on the present, only the weld map is simulated to match a received procurement material to the line set according to priority.

5. The project management device of claim 1, wherein work front statuses of individual constituent units are first calculated on a construction type basis while considering at least one of a drawing and a material according to the construction type of the project, and then the work front statuses of the individual constituent units are added up on a CWP basis to obtain the work front statuses based on the CWPs.

6. A project management method comprising:
dividing, a division unit, a project into n construction work packages (CWPs) based on a construction type constituting the project, a minimum unit area for managing the project, and design information; and
classifying, by a display unit that is separated into three distinct areas, the n CWPs according to construction statuses and work front statuses, by (1) displaying, in a first area of the three distinct areas, a total number of CWPs, (2) displaying, in a second area of the three distinct areas, a grid board in which the n CWPs are displayed in a grid form, and (3) displaying, in a third area of the three distinct areas, classifications of work front statuses,
wherein the second area of the display unit includes at least four distinct regions in which grid boxes are positioned, each region of the four distinct regions being associated with a different risk level;
wherein a horizontal axis of the grid form indicates stage-based construction statuses, and a vertical axis of the grid form indicates stage-based work front statuses, wherein each of grid boxes the grid form indicates information on a construction status and a work front status, and information on the number of CWPs having the construction status and the work front status,
wherein in a rightward direction along the horizontal axis, a construction status of a started construction is shown, and then a construction status of a non-started construction is shown,
wherein the construction type includes piping, a steel frame, machinery, and civil engineering, and the work front statuses are calculated separately based on present and future, wherein when the work front statuses are calculated based on the future, work front statuses of individual constituent units are calculated by matching a procurement arrival and a scheduled material to a line set according to priority through three independent sequential simulations, and then the work front statues of the individual constituent units are added up on a CWP basis to obtain CWP-based work front statuses, and wherein the three independent sequential simulations are performed in an order of: a weld map that is a detailed drawing for performing an actual construction based on the line, which is an individual constituent unit of piping; an ISO drawing that is a drawing before preparing a detailed construction drawing; and 3D that is a drawing before preparing a line drawing.

7. A project management method comprising:
dividing, by a division unit, a project into n construction work packages (CWPs) based on a construction type constituting the project, a minimum unit area for managing the project, and design information; and
classifying, by a display unit that is separated into three distinct areas, the n CWPs according to construction statuses and work front statuses, by (1) displaying, in a first area of the three distinct areas, a total number of CWPs, (2) displaying, in a second area of the three distinct areas, a grid board in which the n CWPs are displayed in a grid form, and (3) displaying, in a third area of the three distinct areas, classifications of the construction statuses and work front statuses,
wherein the second area of the display unit is further separated into four distinct regions in which grid boxes are positioned, each region of the four distinct regions being associated with a different risk level;
wherein a horizontal axis of the grid form indicates stage-based construction statuses, and a vertical axis of the grid form indicates stage-based work front statuses,
wherein each of grid boxes of the grid form indicates information on a construction status and a work front status, and information on the number of CWPs having the construction status and the work front status,
wherein in a rightward direction along the horizontal axis, a construction status of a started construction is shown, and then a construction status of a non-started construction is shown, and
wherein the project management method further comprises selecting only CWPs corresponding to a grid box from the n CWPs by filtering when the information on the number of CWPs in the grid box is clicked by a user, wherein detailed information on the selected CWPs are shown.

8. A computer readable recording medium having recorded therein a program for executing the project management method of claim 6.

9. A computer readable recording medium having recorded therein a program for executing the project management method of claim 7.

* * * * *